United States Patent
Takamoto et al.

(10) Patent No.: US 7,608,309 B2
(45) Date of Patent: Oct. 27, 2009

(54) RESIN COMPOSITION, FILM AND IMAGE DISPLAY DEVICE UTILIZING THE RESIN COMPOSITION

(75) Inventors: Tetsufumi Takamoto, Minami-Ashigara (JP); Seiya Sakurai, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 827 days.

(21) Appl. No.: 11/088,988

(22) Filed: Mar. 24, 2005

(65) Prior Publication Data
US 2006/0036059 A1 Feb. 16, 2006

(30) Foreign Application Priority Data
Mar. 24, 2004 (JP) ............... 2004-087398

(51) Int. Cl.
- C09K 19/00 (2006.01)
- C09K 19/52 (2006.01)
- C08G 63/02 (2006.01)
- C08G 69/08 (2006.01)
- C08G 73/10 (2006.01)

(52) U.S. Cl. ............... 428/1.1; 430/270.1; 528/272; 528/310

(58) Field of Classification Search ............... 528/272, 528/310; 430/270.1; 428/1.1
See application file for complete search history.

(56) References Cited

U.S. PATENT DOCUMENTS

| 4,430,493 A | 2/1984 | Rieder |
| 4,967,306 A | 10/1990 | Hampl, Jr. et al. |
| 2005/0203257 A1* | 9/2005 | Uchida et al. ............... 525/437 |

FOREIGN PATENT DOCUMENTS

| DE | 3434286 | 5/1985 |
| JP | 62-273531 A | 11/1987 |
| JP | 06-248063 A | 9/1994 |
| JP | 2000-500792 A | 1/2000 |
| JP | 2000-227603 A | 8/2000 |
| JP | 2001-150584 A | 6/2001 |
| JP | 2002-220564 A | 8/2002 |
| WO | WO 97/14739 A1 | 4/1997 |

* cited by examiner

*Primary Examiner*—Geraldina Visconti
(74) *Attorney, Agent, or Firm*—Buchanan Ingersoll & Rooney PC

(57) ABSTRACT

A resin composition containing a polymer comprising a repeating unit having a spiro structure and/or a cardo structure. The resin composition has superior heat resistance and is utilized to produce an optical film and an image display.

18 Claims, No Drawings

RESIN COMPOSITION, FILM AND IMAGE DISPLAY DEVICE UTILIZING THE RESIN COMPOSITION

BACKGROUND OF THE INVENTION

1. Field of the Invention

The present invention relates to a novel resin composition having superior heat resistance, optical characteristics and mechanical characteristics, a film and optical component comprising the resin composition as well as an image display device and flat panel display utilizing the film.

2. Description of the Related Art

Inorganic glass materials show superior transparency, superior heat resistance and small optical anisotropy, and therefore they are widely used as transparent materials. However, because inorganic glass has a large specific gravity and is brittle, molded grass products have drawbacks that they are heavy, likely to break etc. Due to these drawbacks, development of plastic materials replacing inorganic glass materials is actively done in recent years.

As plastic materials aiming at replacement of such inorganic glass materials, for example, polymethyl methacrylates, polycarbonates, polyethylene terephthalates and so forth are known. Because these plastic materials have a light weight and superior mechanical characteristics and show superior workability, they are recently used for various purposes such as lenses and films.

Further, in the field of flat panel displays such as liquid crystal displays, improvement of damage resistance, lighter weight and smaller thickness have been increasingly needed, and replacement of glass substrates with plastic film substrates is studied. Because plastic film substrates can be flexible substrates, they can be used as substrates of display devices for mobile information communication equipments such as cellular phones and portable information terminals such as electronic notes and laptop personal computers, and therefore plastic film substrates are highly needed.

As heat resistant plastics used for the aforementioned purposes, heat resistant amorphous polymers such as modified polycarbonates (modified PC, see, for example, Japanese Patent Laid-open Publication (Kokai) No. 2000-227603 (claim 7, [0009] to [0019])), polyether sulphones (PES, see, for example, Japanese Patent Laid-open Publication No. 2000-284717 ([0010], [0021] to [0027])) and cycloolefin copolymers (see, for example, Japanese Patent Laid-open Publication No. 2001-150584 ([0027] to [0039])) are known so far.

However, they have a problem that, even if these heat resistant plastics are used, sufficient heat resistance as plastic film substrates cannot be obtained. That is, they have a problem that if a conductive layer is formed on a plastic substrate utilizing any of those heat resistant plastics and then the substrate is exposed to a temperature of 150° C. or higher for providing an oriented film or the like, conductivity and gas barrier property are markedly degraded. Further, for disposition of TFT in the production of active matrix type image display devices, further higher heat resistance is required.

Furthermore, conventional plastic substrates are inferior to glass substrates in optical characteristics. That is, glass has a characteristic that it is optically isotropic in itself. On the other hand, when a plastic material is molded into a film shape, they causes birefringence due to molecular orientation depending on film formation conditions and intrinsic birefringence peculiar to each resin. If a plastic film used for a substrate of display causes birefringence, it causes marked degradation of display quality such as coloration of displayed images and reduction of contrast. Therefore, plastic film substrates are desired to have both of optical isotropy and heat resistance.

As a technique for solving the aforementioned problems of plastic film substrates concerning optical characteristics, for example, Japanese Patent Laid-open Publication (Kokai) No. 2000-227603 mentioned above describes a polycarbonate obtained by copolymerization of 9,9-bis(4-hydroxyphenyl) fluorene (henceforth referred to as "BPFL") and bisphenol A. This document describes a technique of utilizing BPFL having a negative birefringence to make birefringence as a polymer small. However, the polycarbonate described in the document has a drawback of insufficient heat resistance, although it shows low birefringence. Further, Japanese Patent Laid-open Publication No. 63-314235 (claims) discloses a low birefringence polycarbonate resin utilizing a spiro compound such as spirobiindanediol. However, the polycarbonate resin described in this document has extremely poor mechanical characteristics, and films obtained by molding it are brittle and have problems for practical use.

Further, it is known that heat resistance can be improved by using a bisphenol having a spiro structure such as spirobiindane or a bisphenol having a cardo structure such as fluorene (for example, Japanese Patent Laid-open Publication No. 60-144326 (claims), Japanese Patent Laid-open Publication No. 57-192432 (claim 1, page 8, Example 6, Table) and Japanese Patent Laid-open Publication No. 3-28222 (claim 1)). However, conventional techniques utilize only dicarboxylic acids of common structure (for example, terephthalic acid and isophthalic acid), and the spiro structure or cardo structure can be introduced into a polymer main chain up to only 50 mol % at most.

As described above, any plastic film substrate having high heat resistance and satisfying required performance such as mechanical characteristics and optical characteristics has not been found yet, and it has been strongly desired to solve the problems of the plastic materials proposed so far.

SUMMARY OF THE INVENTION

The present invention was accomplished in order to solve the problems of the conventional plastic materials, and an object of the present invention is to provide a resin composition having superior heat resistance, optical characterstics and mechanical characteristics.

Another object of the present invention is to provide an optical film and optical component utilizing such a resin composition as well as a flat panel display utilizing a plastic film substrate comprising such a resin composition.

The inventors of the present invention conducted various researches about plastic materials in order to achieve the aforementioned objects, and as a result, they found that the aforementioned problems could be solved by a polymer characterized by containing repeating units having a spiro structure or cardo structure, and the obtained resin composition satisfied all of the desired heat resistance, optical characteristics, mechanical characteristics and so forth. Thus, they accomplished the present invention.

That is, the objects of the present invention are achieved by the present invention described in (1) to (11) mentioned below.

(1) A resin composition containing a polymer comprising a chemical structure represented by the following formula (1) or (2) as a repeating unit:

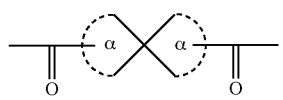

Formula (1)

wherein, in the formula (1), the rings α represent a monocyclic or polycyclic ring, and two of the rings α may be identical or different, and are bound via a spiro bond,

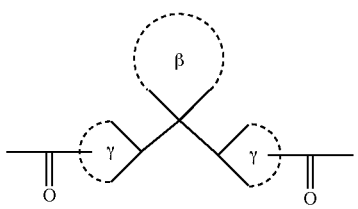

Formula (2)

wherein, in the formula (2), the ring β and the rings γ represent a monocyclic or polycyclic ring, and two of the rings γ may be identical or different, and bond to one quaternary carbon atom in the ring β.

(2) A dicarboxylic acid represented by the following formula (3):

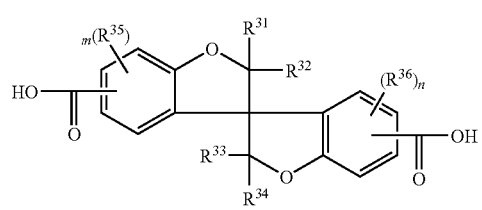

Formula (3)

wherein, in the formula (3), $R^{31}$ to $R^{34}$ each independently represent hydrogen atom or a substituent, $R^{35}$ and $R^{36}$ each independently represent a substituent, and m and n each independently represent an integer of 0 to 3.

(3) The resin composition according to (1), wherein the polymer is derived from the dicarboxylic acid according to (2) or a derivative thereof.

(4) A film utilizing the resin composition according to (1) or (3).

(5) An optical film utilizing the resin composition according to (1) or (3).

(6) An optical component utilizing the resin composition according to (1) or (3).

(7) A gas barrier film comprising the film according to (4) or (5) provided with a gas barrier layer or at least one surface.

(8) A conductive film comprising the film according to (4), (5) or (7) provided with a transparent conductive layer on at least one surface.

(9) An image display utilizing the conductive film according to (8) as a substrate.

(10) A flat panel display utilizing the conductive film according to (8) as a substrate.

(11) The flat panel display according to (10), which comprises a liquid crystal panel or an organic electroluminescence panel as a display device.

The polymer of the resin composition of the present invention contains a particular spiro structure or cardo structure as repeating units. By this characteristic, a resin composition satisfying all of the desired superior heat resistance, optical characteristics and mechanical characteristics can be provided according to the present invention. Further, because the film and optical component of the present invention utilize the resin composition, a film having all of superior heat resistance, optical characteristics and mechanical characteristics can be provided according to the present invention. Furthermore, because the image display device and flat panel display of the present invention utilize the aforementioned film provided with a conductive layer, an image display device and flat panel display of high quality can be provided according to the present invention.

BEST MODE FOR CARRYING OUT THE INVENTION

Hereafter, the resin composition, optical component, film and flat panel display of the present invention will be explained in detail.

The ranges expressed with "to" in the present specification mean ranges including the numerical values indicated before and after "to" as a lower limit value and upper limit value.

[Resin Composition and Intermediate Thereof]

The polymer of the resin composition of the present invention contains a chemical structure represented by the following formula (1) or (2) in the main chain of the polymer as a repeating unit.

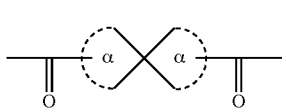

Formula (1)

In the formula (1), the rings α represent a monocyclic or polycyclic ring, and two of the rings may be identical or different, and are bound via a spiro bond.

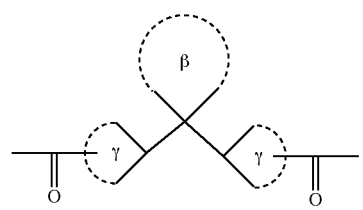

Formula (2)

In the formula (2), the ring β and the rings γ represent a monocyclic or polycyclic ring, and two of the rings γ may be identical or different, and bond to one quaternary carbon atom in the ring β.

In the formula (1), the rings α represent a monocyclic or polycyclic ring. They preferably have a polycyclic structure, more preferably bi- to pentacyclic structure, still more preferably bi- or tricyclic structure. Although the ring to which each carbonyl group bonds may be an aliphatic ring or an aromatic ring, an aromatic ring is preferred.

Each of the rings α may have a substituent, and preferred examples of the substituent include an alkyl group preferably having 1 to 10 carbon atoms (e.g., methyl group, ethyl group, isopropyl group, tert-butyl group etc.), a halogen atom (e.g., chlorine atom, bromine atom, iodine atom etc.), an aryl group preferably having 6 to 20 carbon atoms (e.g., phenyl group, biphenyl group, naphthyl group etc.), an alkoxyl group preferably having 1 to 10 carbon atoms (e.g., methoxy group, ethoxy group, isopropoxy group etc.), an acyl group preferably having 2 to 10 carbon atoms (e.g., acetyl group, propionyl group, butyryl group etc.), an acylamino group preferably having 1 to 10 carbon atoms (e.g., formylamino group, acetylamino group etc.), nitro group, cyano group and so forth.

Preferred examples of the structure represented by the formula (1) include a spirobibenzofuran structure represented by the formula (4), a spirobiindane structure represented by the formula (5) and a spirobichroman structure represented by the formula (6).

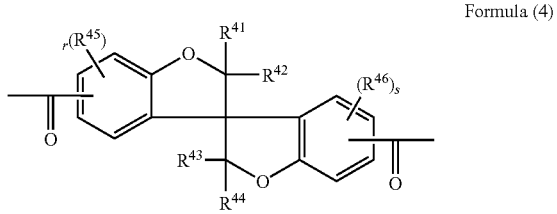

Formula (4)

In the formula (4), $R^{41}$ to $R^{44}$ each independently represent hydrogen atom or a substituent. $R^{45}$ and $R^{46}$ each independently represent a substituent. Examples of the substituent include those mentioned in the explanation of the formula (1). $R^{41}$ to $R^{44}$ preferably represent hydrogen atom, a halogen atom, an alkyl group or an aryl group, more preferably hydrogen atom. $R^{45}$ and $R^{46}$ preferably represent a halogen atom, an alkyl group, an aryl group, an alkoxyl group, nitro group or cyano group, more preferably hydrogen atom, a halogen atom, an alkyl group or an alkoxyl group. r and s each independently represent an integer of 0 to 3, preferably an integer of 0 to 2. $R^{41}$ to $R^{46}$ may bond to form a ring, preferably a 5- to 7-membered ring. Although the position to which each carbonyl group bonds may be any position on the aromatic ring, the 5- or 6-position of the benzofuran structure is preferred.

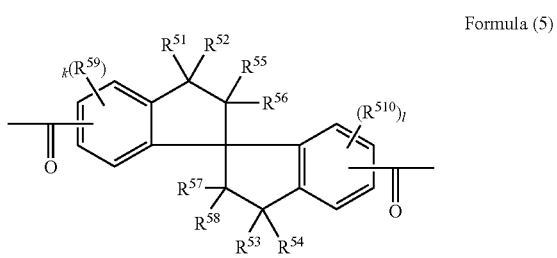

Formula (5)

In the formula (5), $R^{51}$ to $R^{58}$ each independently represent hydrogen atom or a substituent. $R^{59}$ to $R^{510}$ each independently represent a substituent. Examples of the substituent include those mentioned in the explanation of the formula (1). $R^{51}$ to $R^{54}$ preferably represent hydrogen atom, an alkyl group, an aryl group, an alkoxyl group or a halogen atom, more preferably an alkyl group or a halogen atom. $R^{55}$ to $R^{58}$ preferably represent hydrogen atom, an alkyl group, an aryl group, an alkoxyl group, an acylamino group, nitro group, cyano group or a halogen atom, more preferably hydrogen atom, an alkyl group or a halogen atom. k and l each independently represent an integer of 0 to 3, preferably an integer of 0 to 2. $R^{59}$ and $R^{510}$ preferably represent a halogen atom, an alkyl group, an aryl group, an alkoxyl group, an amido group, nitro group or cyano group, more preferably hydrogen atom, a halogen atom, an alkyl group or an alkoxyl group. $R^{51}$ to $R^{510}$ may bond to each other to form a 5- to 7-membered ring. Although the position to which each carbonyl group bonds may be any position on the aromatic ring, the 5- or 6-position of the indan structure is preferred.

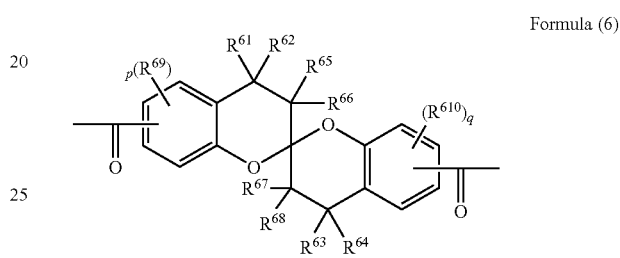

Formula (6)

In the formula (6), $R^{61}$ to $R^{68}$ each independently represent hydrogen atom or a substituent. $R^{69}$ and $R^{610}$ each independently represent a substituent. Examples of the substituent include those mentioned in the explanation of the formula (1). $R^{61}$ to $R^{64}$ preferably represent an alkyl group, an aryl group or a halogen atom. $R^{65}$ to $R^{68}$ preferably represent hydrogen atom, a halogen atom, an alkyl group or an aryl group. p and q each independently represent an integer of 0 to 3, preferably an integer of 0 to 2. $R^{69}$ and $R^{610}$ preferably represent a halogen atom, an alkyl group, an aryl group or an alkoxyl group. $R^{61}$ to $R^{610}$ may bond to each other to form a 5- to 7-membered ring. Although the position to which each carbonyl group bonds may be any position on the aromatic ring, the 6- or 7-position of the chroman structure is preferred.

Among the structures of the formulas (4) to (6), the spirobibenzofuran structure of the formula (4) is particularly preferred.

Specific example of the structure of the formula (1) will be mentioned below. However, the present invention is not limited to these.

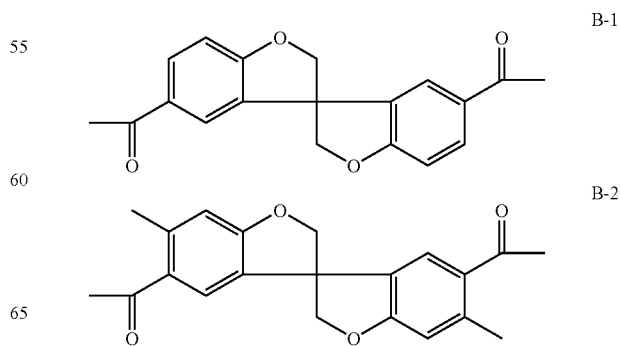

B-1

B-2

-continued
B-3
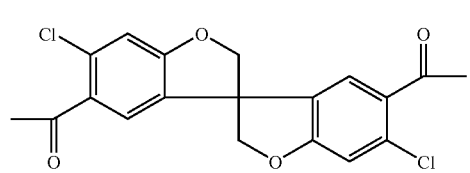
B-4
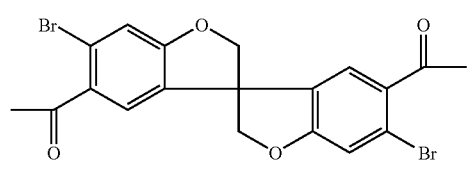
B-5
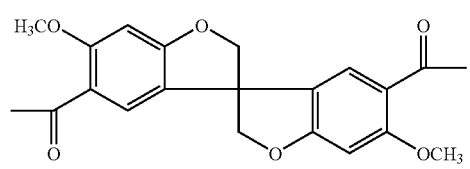
B-6
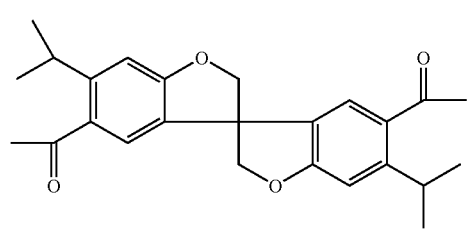
B-7
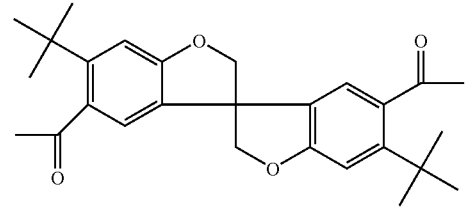
B-8
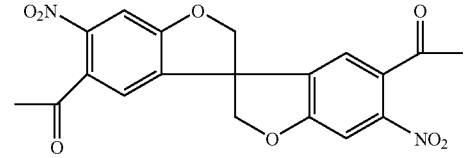
B-9
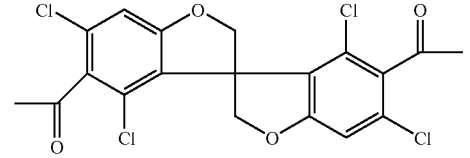
B-10
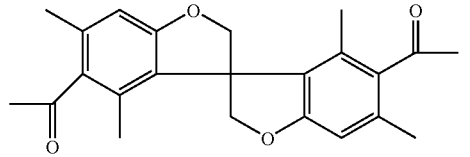
-continued
B-11
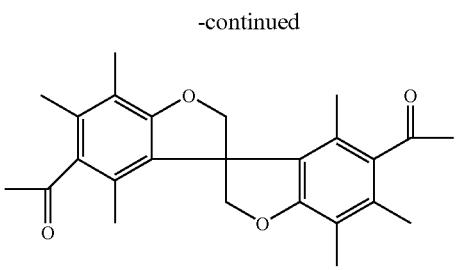
B-12
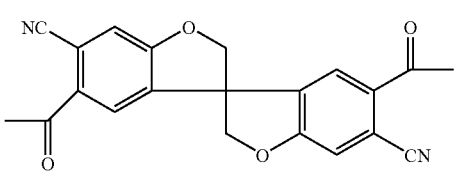
B-13
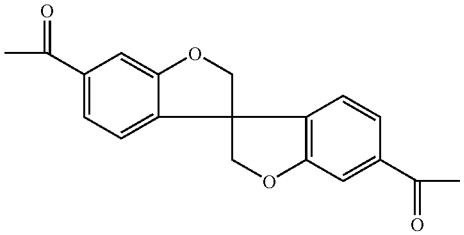
B-14
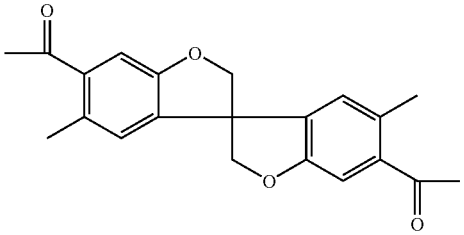
B-15
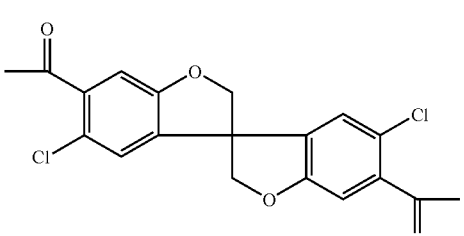
B-16
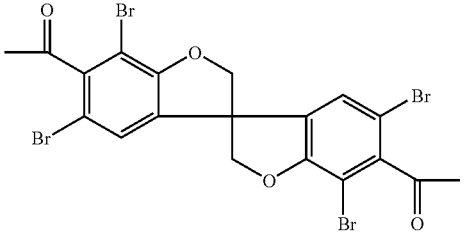
I-1
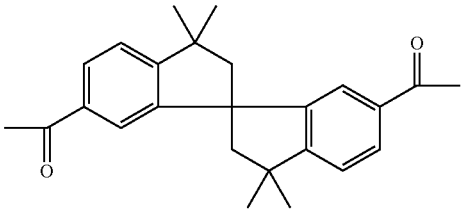

I-2 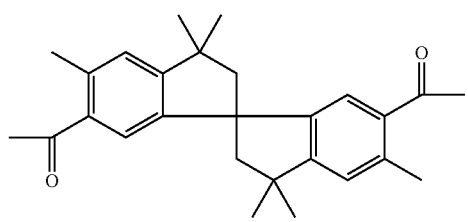
I-3 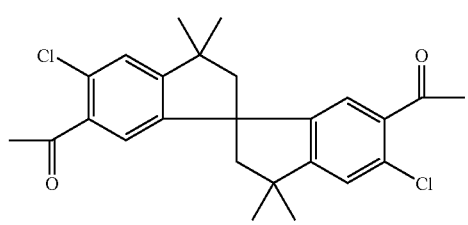
I-4 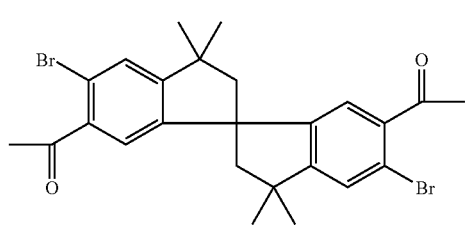
I-5 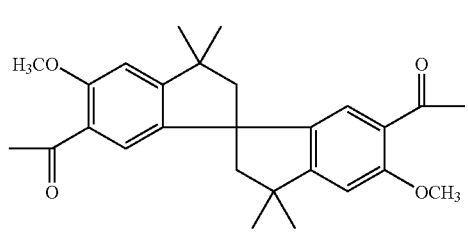
I-6 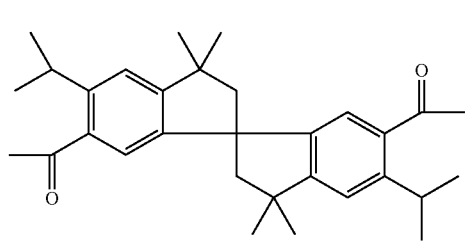
I-7 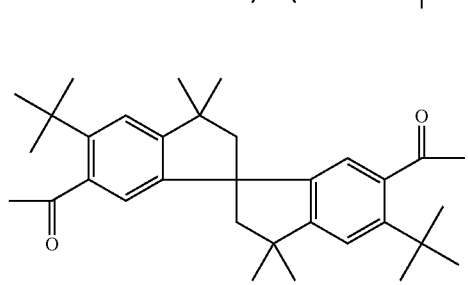
I-8 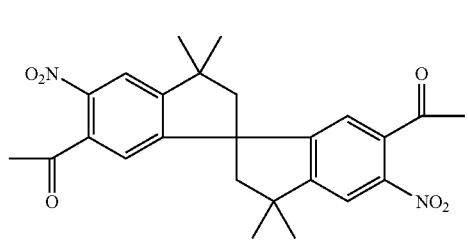
I-9 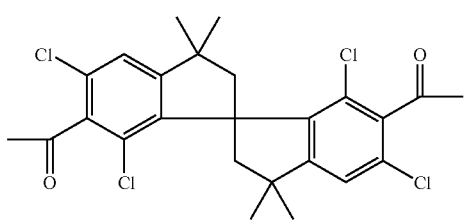
I-10 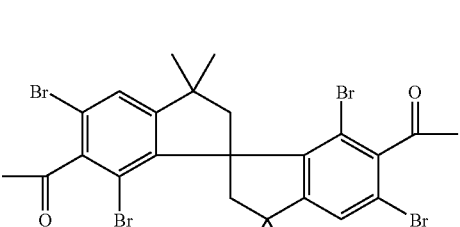
I-11 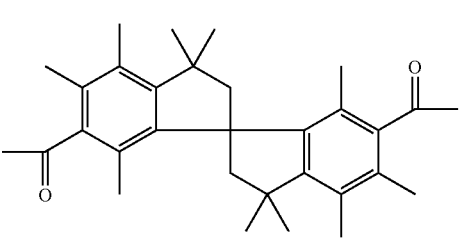
I-12 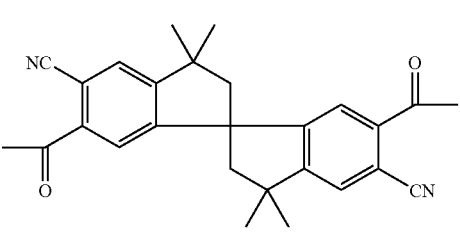
I-13 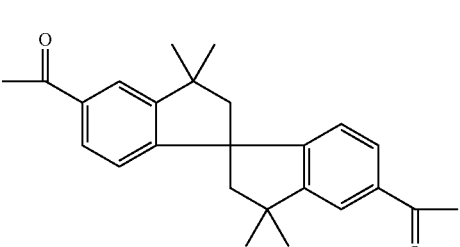
I-14 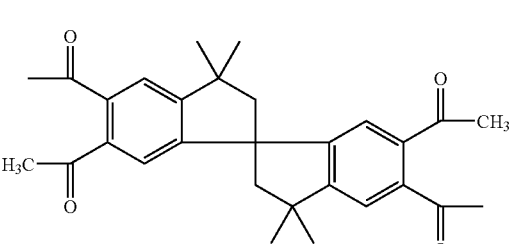

-continued
I-15
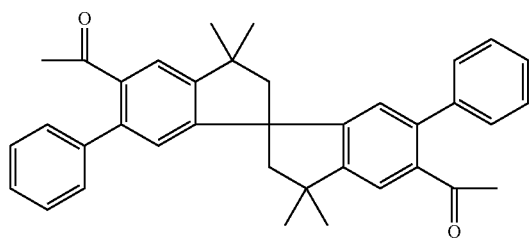
I-16
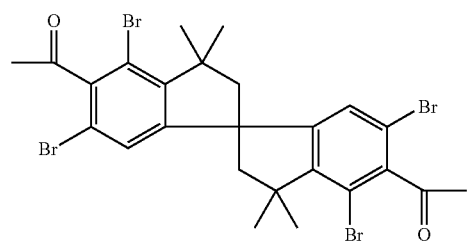
C-1
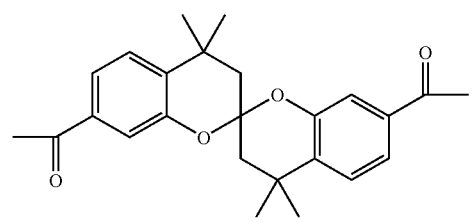
C-2
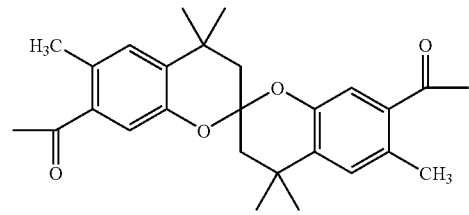
C-3
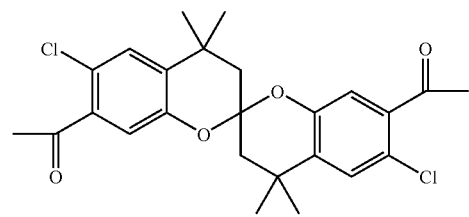
C-4
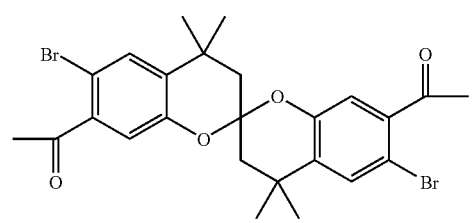
C-5
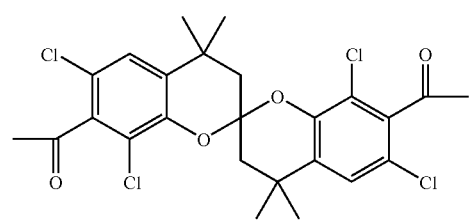
-continued
C-6
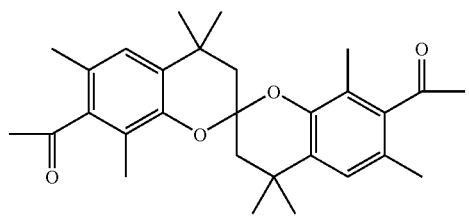
C-7
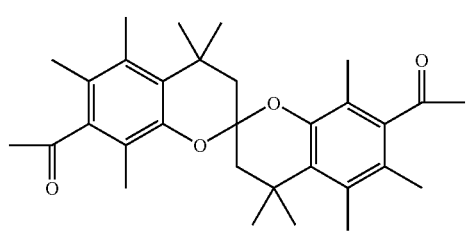
C-8
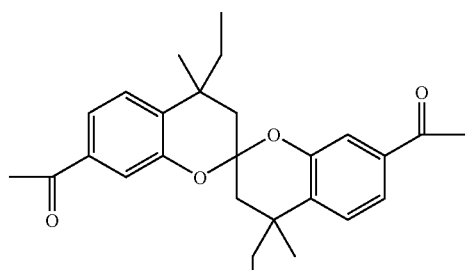
C-9
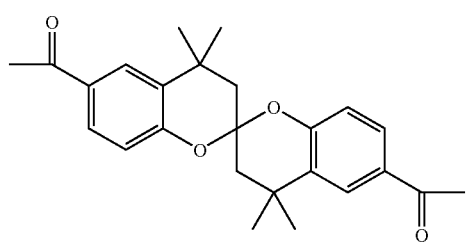
C-10
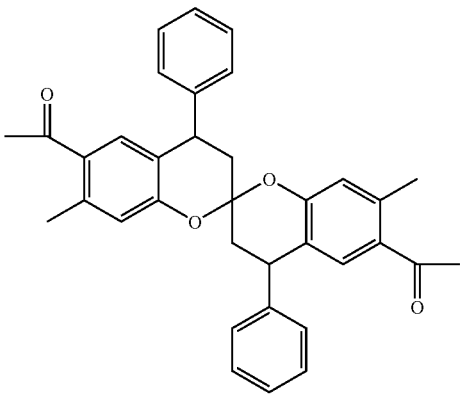
C-11
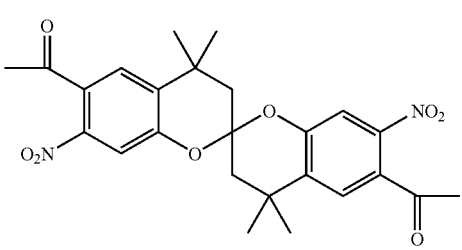

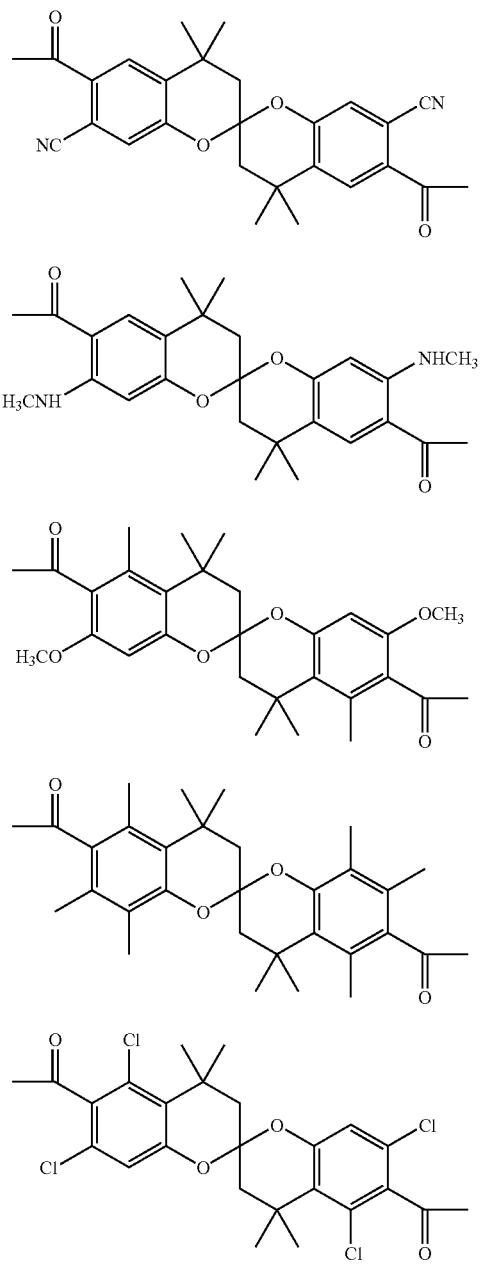

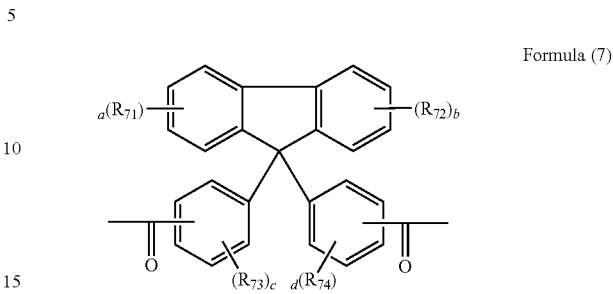

Particularly preferred examples of the structure represented by the formula (2) include a fluorene structure represented by the following formula (7).

Formula (7)

In the formula (7), $R^{71}$ to $R^{74}$ each independently represent a substituent such as those mentioned in the explanation of the formula (1). $R^{71}$ to $R^{74}$ preferably represent an alkyl group, an aryl group, an alkoxyl group, an acylamino group, nitro group, cyano group or a halogen atom, more preferably an alkyl group, an aryl group or a halogen atom. a, b, c and d each independently represent an integer of 0 to 4. $R^{71}$ to $R^{74}$ may bond to each other to form a 5- to 7-membered ring. Although the position to which each carbonyl group bonds may be any position on the aromatic ring, the meta- or para-position of the spiro carbon is preferred.

Specific examples of the repeating unit represented by the formula (2) are mentioned below. However, the present invention is not limited to these.

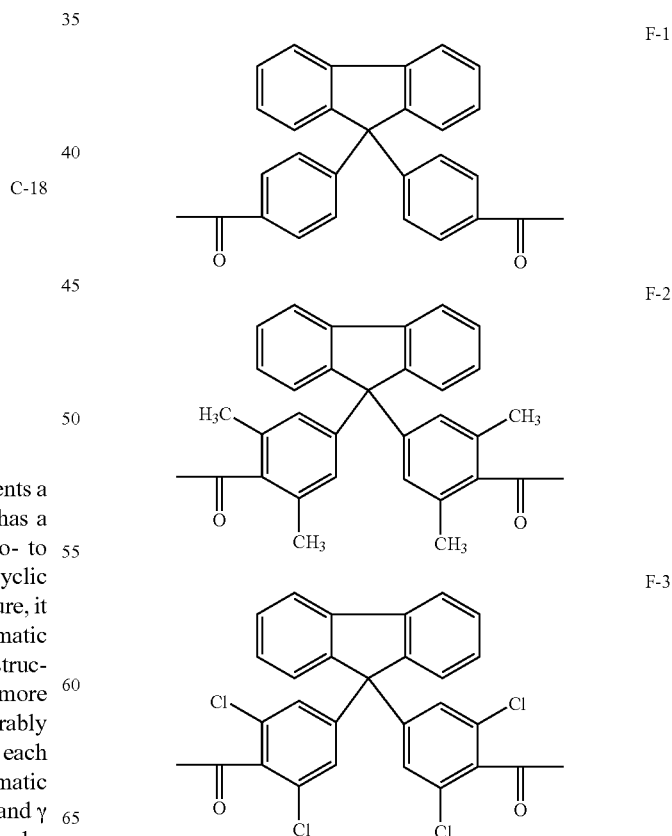

In the formula (2) mentioned above, the ring β represents a monocyclic or polycyclic ring structure. It preferably has a mono- to pentacyclic structure, more preferably mono- to tetracyclic structure, still more preferably bi- to tetracyclic structure. When the ring β represents a polycyclic structure, it is preferred that at least one of the rings should be an aromatic ring. The rings γ represent a monocyclic or polycyclic structure. They preferably represent a polycyclic structure, more preferably bi- to pentacyclic structure, still more preferably bi- or tricyclic structure. Although the ring to which each carbonyl group bonds may be an aliphatic ring or an aromatic ring, an aromatic ring is preferred. Each of the rings β and γ may have a substituent such as those mentioned in the explanation of the formula (1).

-continued
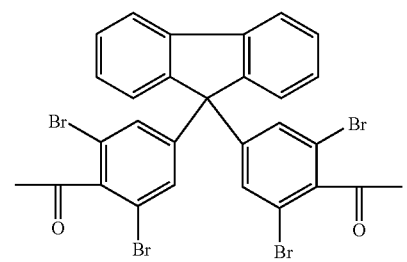
F-4
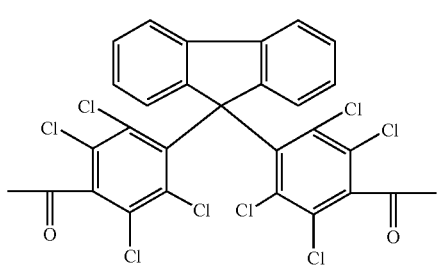
F-5
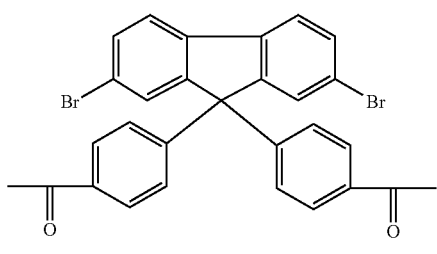
F-6
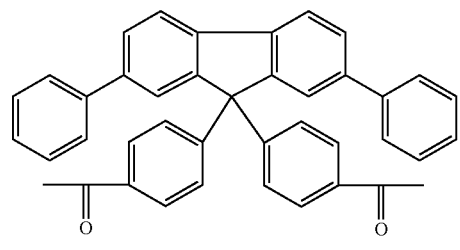
F-7
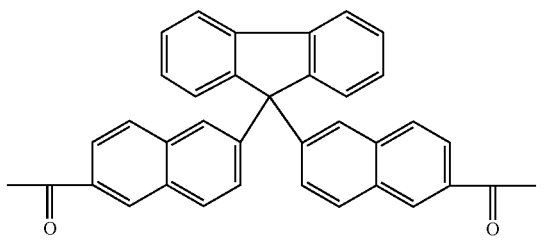
F-8
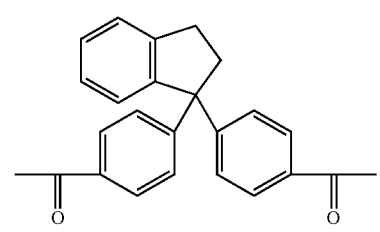
F-9
-continued
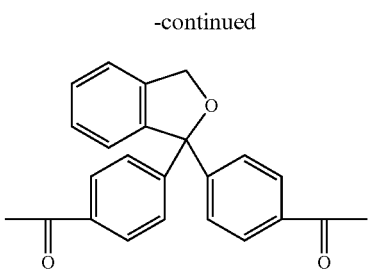
F-10
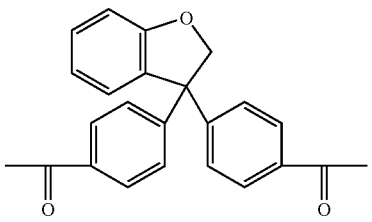
F-11
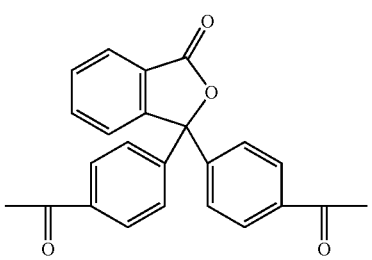
F-12
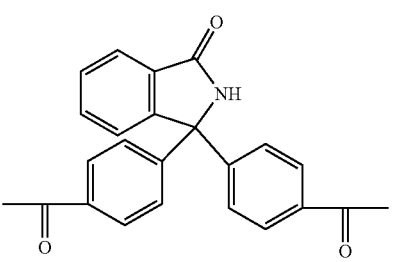
F-13
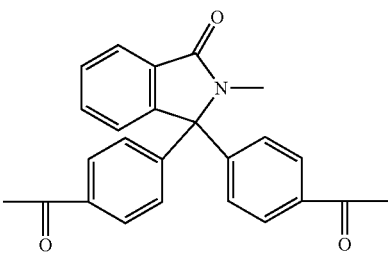
F-14
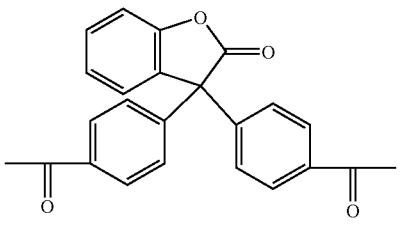
F-15

The polymer containing a structure represented by the formula (1) or (2) as repeating units may be a polymer formed with one or more kinds of bonding schemes among various bonding schemes such as those of polyester, polyarylate, polyamide and polyketone.

The polymer contained in the resin composition of the present invention suitably contains the repeating unit structure represented by the aforementioned formula (1) or (2) in an amount of 5 to 100 mol %, preferably 10 to 100 mol %, more preferably 20 to 100 mol %.

Specific examples of preferred polymers having a structure represented by the formula (1) or (2) are mentioned below. However, the present invention is not limited to these.

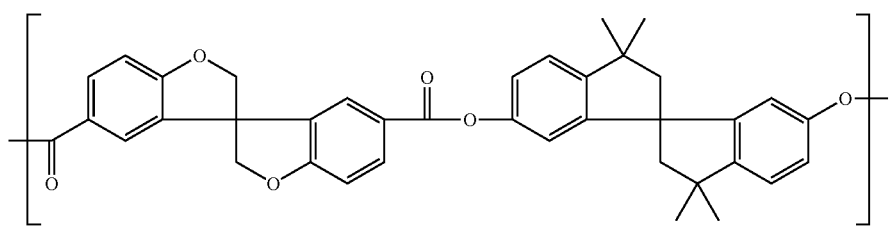
P-1
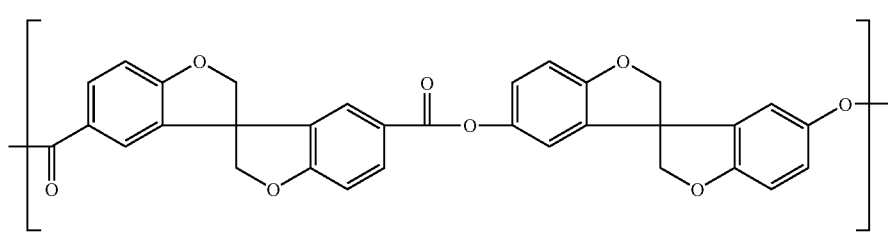
P-2
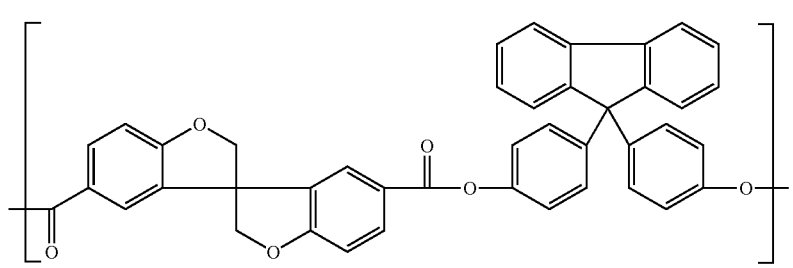
P-3
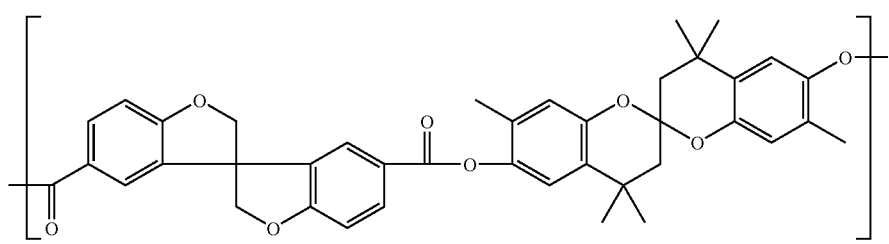
P-4
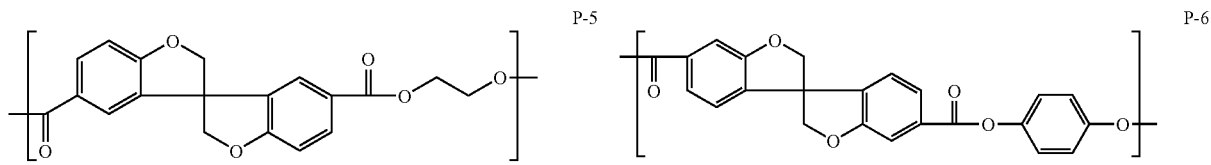
P-5　　P-6
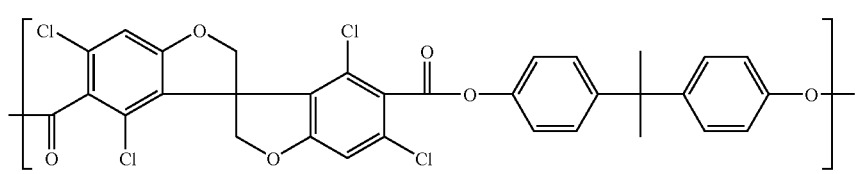
P-7
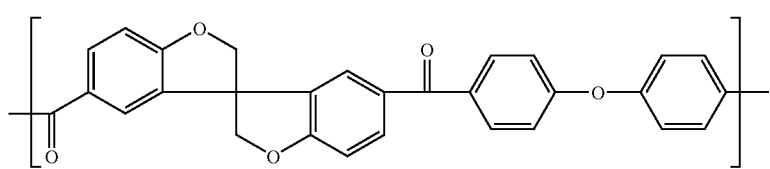
P-8

-continued
P-9
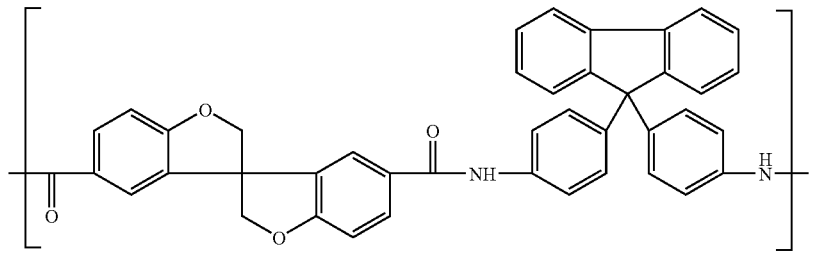
P-10
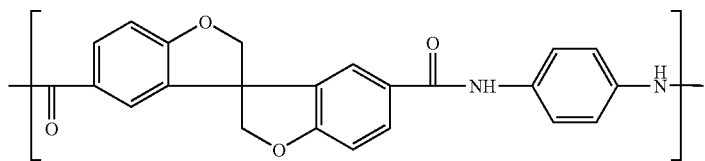
P-11
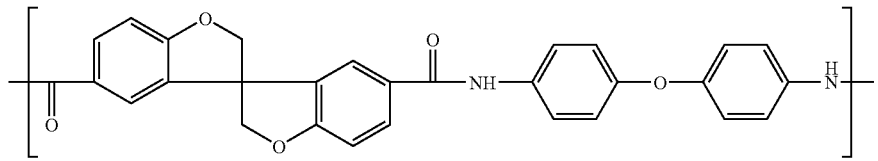
P-12
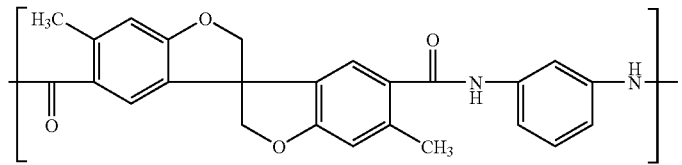
P-13
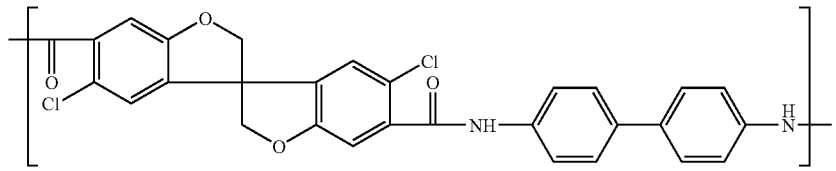
P-14
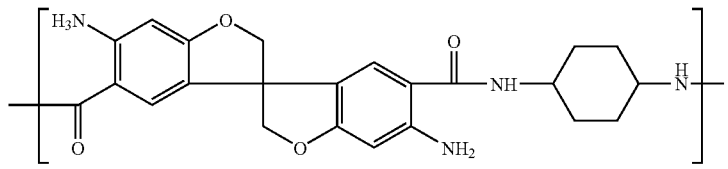
P-15
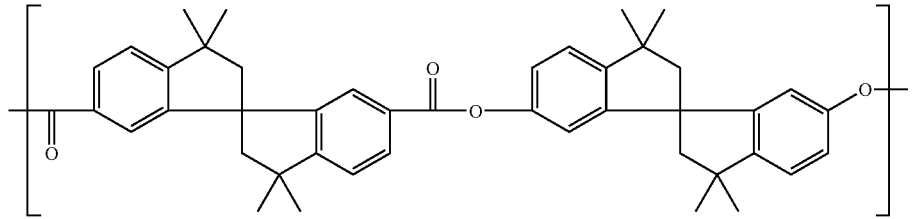

-continued
P-16
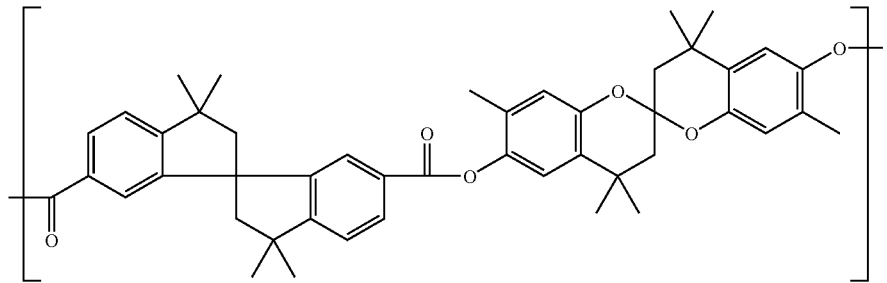
P-17
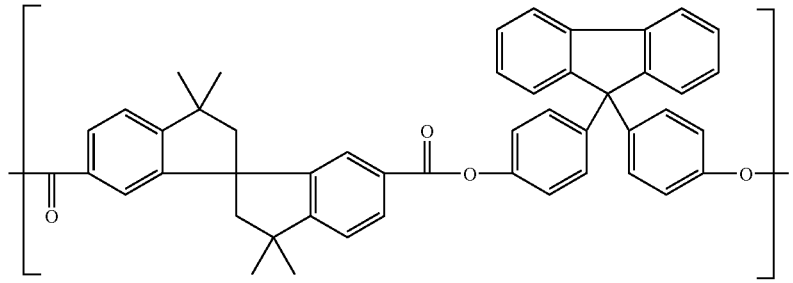
P-18 P-19
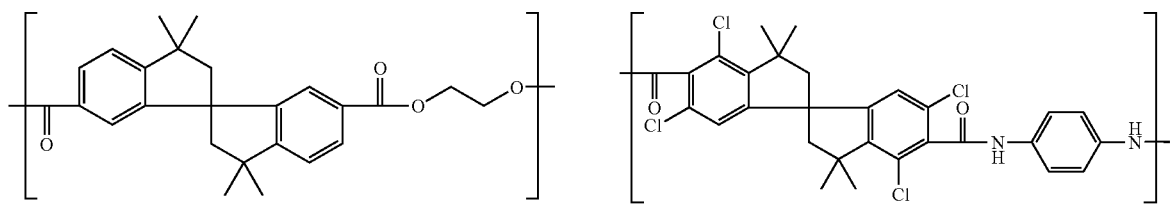
P-20
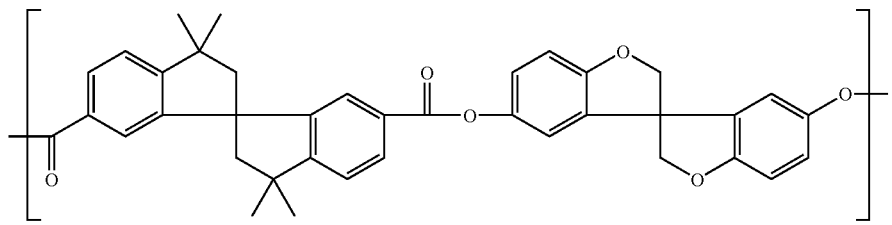
P-21
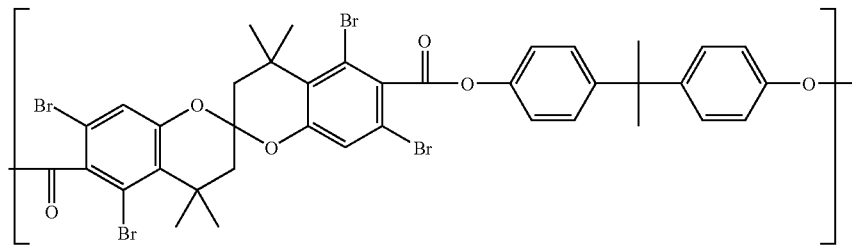
P-22
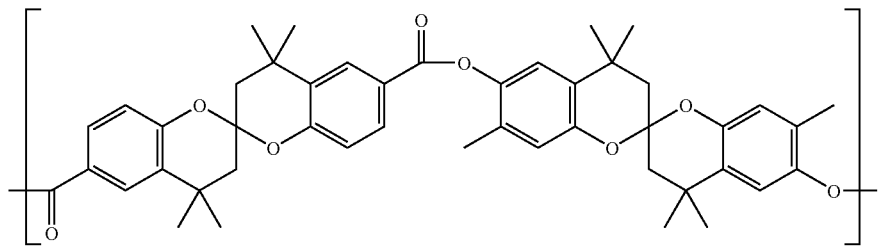

-continued
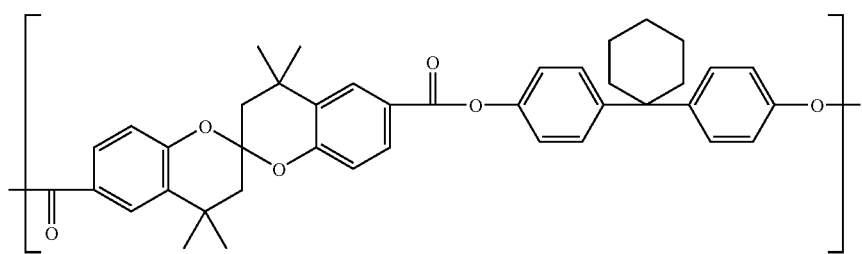
P-23
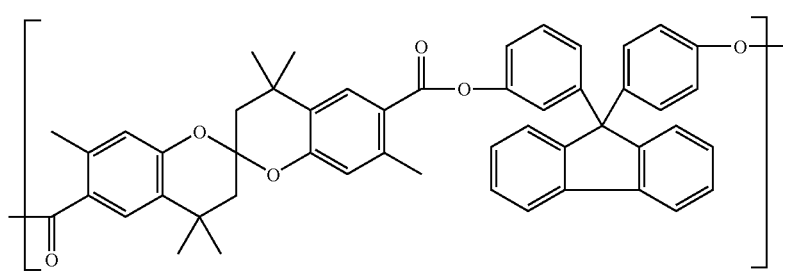
P-24
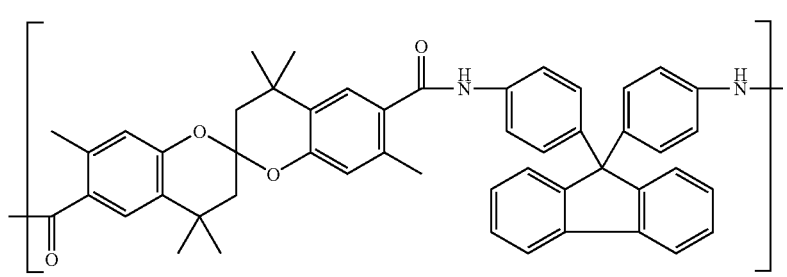
P-25
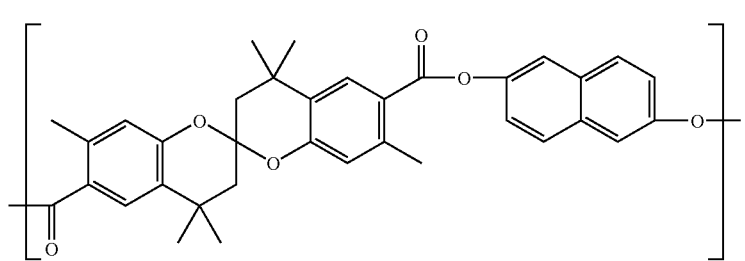
P-26
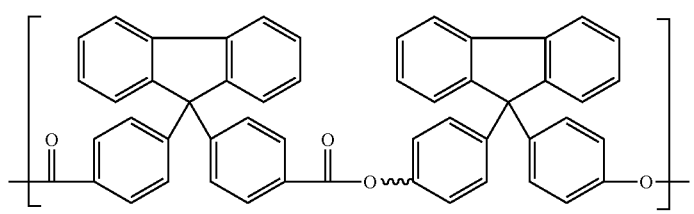
P-27
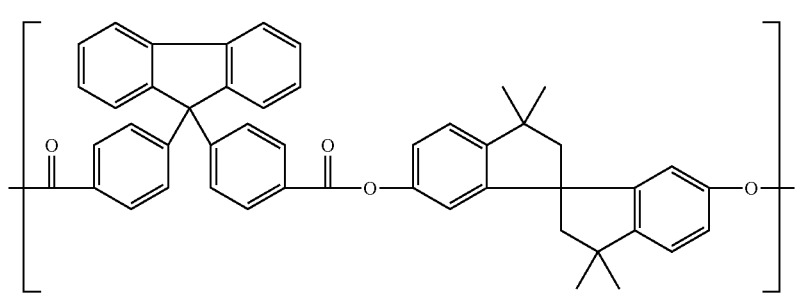
P-28

-continued
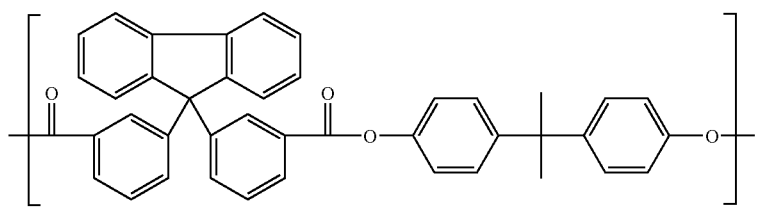
P-29
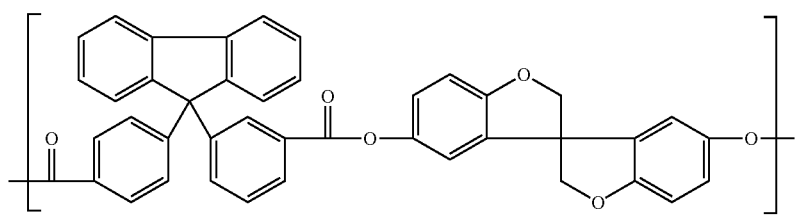
P-30
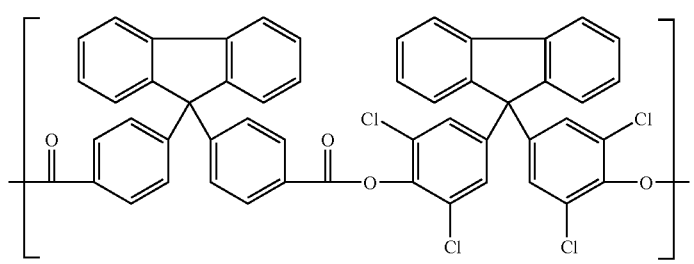
P-31
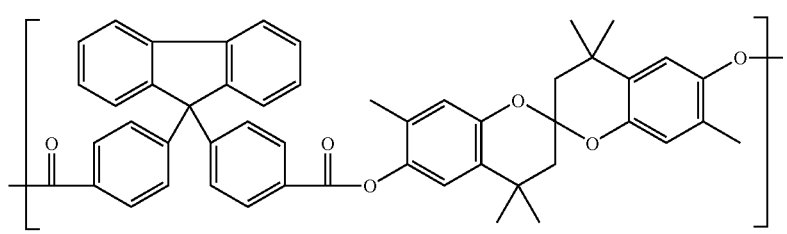
P-32
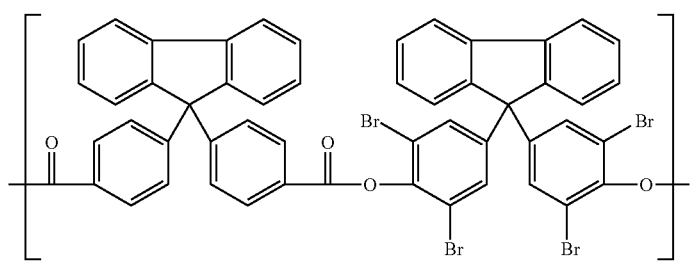
P-33
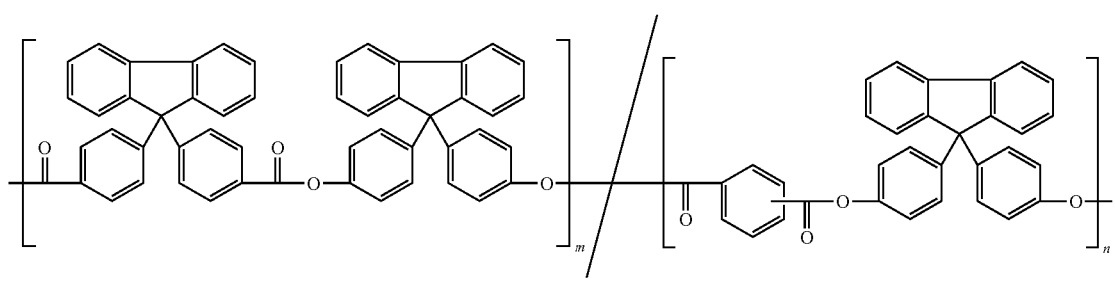

-continued

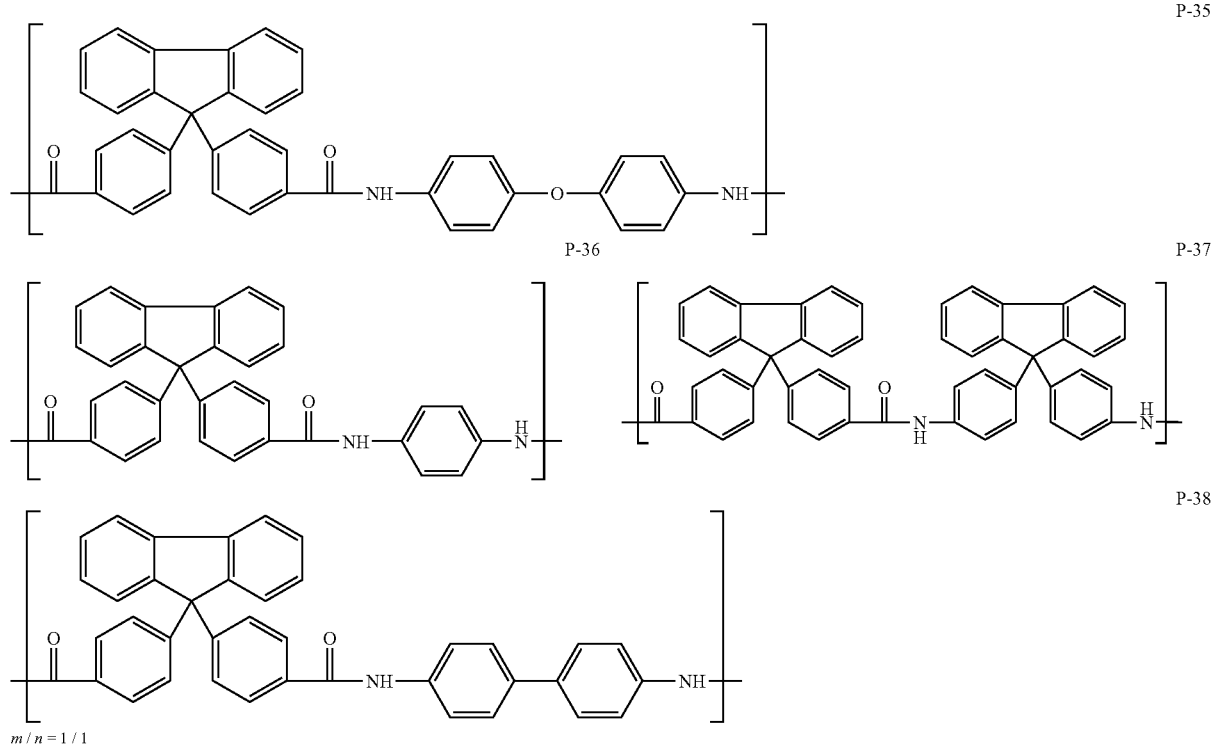

The polymers having a structure represented by the formula (1) or formula (2) used in the present invention may be used independently, and may be used as a mixture of two or more kinds of them. Moreover, they may be homopolymers or copolymers. When a copolymer is used, a known repeating unit not containing a structure represented by the formula (1) or (2) in the repeating unit may be copolymerized within such a degree that the advantages of the present invention should not be degraded. Copolymers more often have improved solubility and transparency compared with homopolymers, and such copolymers can be preferably used.

The polymer of the resin composition of the present invention can be synthesized by using a dicarboxylic acid having the spiro structure or cardo structure or derivative thereof as a monomer. Specific examples of such a dicarboxylic acid and derivative thereof are mentioned below.

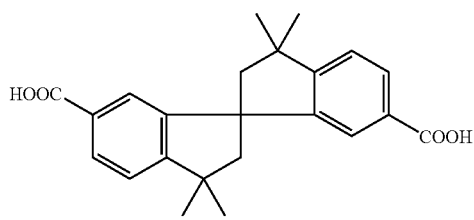

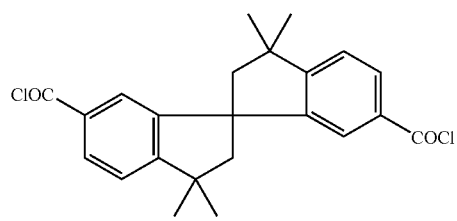

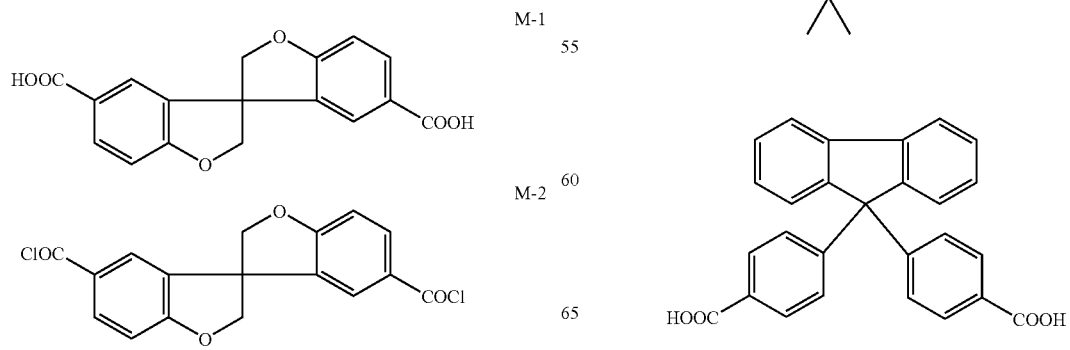

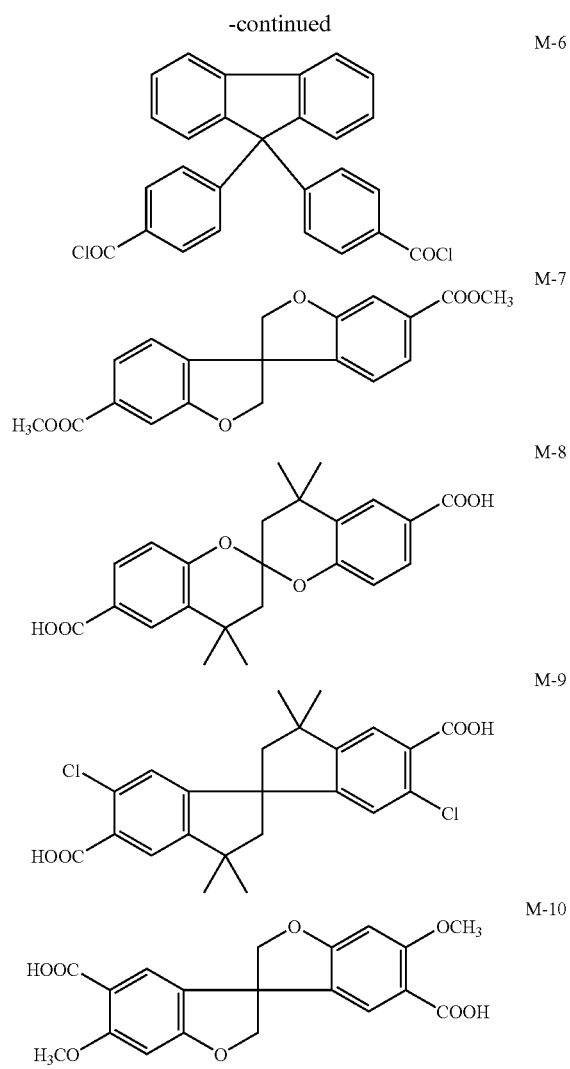

The aforementioned dicarboxylic acids and derivatives thereof can be obtained by cyclization polymerization of a corresponding aromatic compound and a corresponding dihalogenated alkyl compound.

The resin composition of the present invention preferably has a glass transition temperature (Tg) of 200° C. or higher, more preferably 220° C. or higher, still more preferably 250° C. or higher.

The polymer of the resin composition of the present invention preferably has a molecular weight of 10,000 to 300,000, more preferably 20,000 to 200,000, most preferably 30,000 to 150,000, in terms of weight average molecular weight (polystyrene converted value). If the molecular weight is about 30,000 to 300,000, sufficient mechanical strength can be obtained when the resin composition is used for a plastic film substrate. On the other hand, if the molecular weight is 500,000 or less, the molecular weight is easily controlled during the synthesis, favorable viscosity of a solution can be obtained, and thus handling is easy. Thus, such a molecular weight is preferred. The molecular weight may be tentatively determined on the basis of corresponding viscosity.

The resin composition of the present invention can be blended with other resins so long as the advantages of the present invention are not degraded. The resin material that can be blended with the resin composition of the present invention may be either a thermoplastic resin or a thermosetting resin.

The resin composition of the present invention may contain a metal oxide/and or composite metal oxide as well as metal oxide obtained by a sol-gel reaction.

The resin composition of the present invention may also contain an inorganic layered compound. By adding an inorganic layered compound to the resin composition of the present invention, the thermal deformation temperature thereof is improved by 2 to 100° C. If the resin composition containing an inorganic layered compound is used for a plastic film substrate, use thereof as a gas barrier film can also be expected. Although the inorganic layered compound used for the present invention is not particularly limited, clay minerals, hydrotalcite compounds and other similar compounds having swelling property and/or cleavage property are preferably used.

The resin composition of the present invention may be further added with various additives (resin property modifiers) such as plasticizers, dyes and pigments, antioxidants, antistatic agents, ultraviolet absorbers, inorganic microparticles, release accelerators, leveling agents and lubricants as required in such a degree that the advantages of the present invention should not be degraded. Further, when the resin composition of the present invention is used as a plastic film substrate, a release film, adhesive material or the like may also be added.

Hereafter, the method for producing the resin composition of the present invention will be explained.

The monomer used for forming the polymer of the resin composition of the present invention can be synthesized by, for example, oxidizing an alkyl group (e.g., methyl group) of a side chain of a basic skeleton having the a spiro structure or cardo structure according to the method described in J. Chem. Soc., sections 418-420 (1962).

The polymer of the resin composition of the present invention can be synthesized by, for example, the method described in "Shin Kobunshi Jikkengaku (New Experimentology of Polymers)", 3, published by Kyoritsu Shuppan.

[Optical Component and Optical Film]

The resin composition of the present invention has superior heat resistance, optical characteristics, mechanical characteristics etc., and therefore it can be suitably utilized for various optical components such as transparent conductive film substrate, TFT substrate, substrate for liquid crystal display, substrate for organic EL display, substrate for electronic paper, substrate for solar battery, substrate for flexible circuit, optical disk substrate, optical waveguide, optical fiber, lens and touch panel.

Further, the resin composition of the present invention can be molded into a film or sheet, and used as a film or optical film. Although known methods can be employed as a method for molding the resin composition of the present invention into a film or sheet, the solution casting method and extrusion method (fusion molding method) are preferably used.

The casting and drying processes of the solution casting method are described in U.S. Pat. Nos. 2,336,310, 2,367,603, 2,492,078, 2,492,977, 2,492,972, 2,607,704, 2,739,069, 2,739,070, British Patent Nos. 640,731, 736,892, Japanese Patent Publication (Kokoku) Nos. 45-4554, 49-5614, Japanese Patent Laid-open Publication Nos. 60-176834, 60-203430 and 62-115035. A solution of the resin composition is preferably cast on a drum or band having a surface temperature of 30° C. or lower, particularly preferably on a metal support having a surface temperature of −10 to 20° C.

Examples of production apparatus for the production of the film of the present invention by the solution casting method include the production apparatuses described in Japanese Patent Laid-open Publication No. 2002-189126, paragraphs [0061] to [0068], FIG. 1, FIG. 2 and so forth. However, the present invention is not limited to use of these apparatuses.

In the solution casting method, the resin composition of the present invention is dissolved in a solvent. The solvent used may be any solvent, so long as a solvent that can dissolve the resin composition of the present invention is chosen. However, a solvent that can dissolve the resin composition of the present invention at a solid concentration of 10% or more at 25° C. is particularly preferred. Further, the solvent used preferably has a boiling point of 200° C. or lower, more preferably 150° C. or lower. When the boiling point is 200° C. or lower, the solvent can be sufficiently dried, and the solvent does not remain in the film. Thus, such a boiling point is preferred.

Examples of such a solvent include methylene chloride, chloroform, tetrahydrofuran, benzene, cyclohexane, toluene, xylene, 1,2-dichloroethane, ethyl acetate, acetone, chlorobenzene, dimethylformamide, dimethylacetamide, methanol, ethanol and so forth. However, the present invention is not limited to use of these solvents.

Two or more kinds of the aforementioned solvents may be mixed for use. Examples of mixed solvent include solvents obtained by mixing methylene chloride with one or several kinds of alcohols having 1 to 5 carbon atoms, and such solvents preferably has an alcohol content of 5 to 20 weight % with respect to the total solvent. Preferred examples further include solvents appropriately mixed with an ether, ketone or ester having 3 to 12 carbon atoms, and such solvents may contain one or several kinds of alcohols having 1 to 5 carbon atoms. Further, the solvents exemplified in Japanese Technical Disclosure No. 2001-1745 (Japan Institute of Invention and Innovation), paragraph 6 and so forth are also included in preferred examples.

The solution used for the solution casting preferably has a resin concentration of 5 to 60 weight %, preferably 10 to 40 weight %, more preferably 10 to 30 weight %. If the resin concentration is 5 to 60 weight %, appropriate viscosity can be obtained, thus thickness can be easily controlled, and favorable film formation property can be obtained.

Although the method for solution casting is not particularly limited, a solution can be cast on a flat plate or roll by using a bar coater, T-die, T-die with bar, doctor blade, roller coater, die coater and so forth.

Although the temperature for drying the solvent may vary depending on the boiling point of the solvent used, drying is preferably performed in two stages. For the first stage, drying is performed at 30 to 100° C. until the weight concentration of the solvent becomes 10% or less, more preferably 5% or less. Then, the film is removed from a flat plate or roll, and drying is performed at a temperature of 60° C. to than the glass transition temperature of the resin as the second stage.

As for removal of the film from the flat plate or roll, the film may be removed immediately after the drying of the first stage, or it may be cooled once and then removed.

Conditions for the extrusion molding are similar to the conditions used for commonly used optical resins. The melting temperature usually employed is in the range of 180 to 350° C., and a temperature of 200 to 300° C. is particularly preferably used.

The film of the present invention may be stretched. Stretching provides advantages of improvement of mechanical strengths of the film such as anti-folding strength, and thus improvement of handling property of the film. In particular, a film having an orientation release stress (ASTM D1504, henceforth abbreviated as "ORS") of 0.3 to 3 GPa along the stretching direction is preferred, because mechanical strength of such a film is improved. ORS herein used is internal stress present in a stretched film or sheet generated by stretching.

Known methods can be used for the stretching, and the stretching can be performed by, for example, the monoaxial stretching method by rollers, the monoaxial stretching method by tenter, simultaneous biaxial stretching method, sequential biaxial stretching method or inflation method at a temperature of from a temperature higher than Tg of the resin by 10° C. to a temperature higher than Tg by 50° C. The stretching ratio is 1.1 to 3.5 times, preferably 1.5 to 2.5 times.

Although the thickness of the film of the present invention is not particularly limited, it is preferably 30 to 700 μm, more preferably 40 to 200 μm, still more preferably 50 to 150 μm. The haze of the film is preferably 3% or less, more preferably 2% or less, still more preferably 1% or less, regardless of the thickness. Further, the total light transmission of the film is preferably 70% or more, more preferably 80% or more, still more preferably 90% or more.

The surface of the film of the present invention may be subjected to saponification, corona discharge treatment, flame treatment, glow discharge treatment or the like in order to improve adhesion with other layers or components. An anchor layer may also be provided on the film surface.

The film of the present invention may be provided with a transparent conductive layer on at least one surface. As the transparent conductive layer, known metal films and metal oxide films can be used. Metal oxide films are particularly preferably used as the transparent conductive layer in view of transparency, conductivity and mechanical characteristics. Examples of the metal oxide films include, for example, metal oxide films such as those of indium oxide, cadmium oxide and tin oxide added with tin, tellurium, cadmium, molybdenum, tungsten, fluorine, zinc, germanium or the like as impurities, zinc oxide, titanium oxide and so forth added with aluminum as impurities. In particular, thin films of indium oxide mainly consisting of tin oxide and containing 2 to 15 weight % of zinc oxide have superior transparency and conductivity, and therefore they are preferably used.

Although the film formation method for the transparent conductive layer may be any method so long as a desired thin film can be formed, a vapor phase deposition method in which a material is deposited from a vapor phase to form a film, such as the sputtering method, vacuum deposition method, ion plating method and plasma CVD method is preferred. The film formation can be attained by, for example, the methods described in Japanese Patent No. 3400324, Japanese Patent Laid-open Publication Nos. 2002-322561 and 2002-361774. The sputtering method is particularly preferred above all, because it can provide superior conductivity and transparency.

Preferred degree of vacuum used for the sputtering method, vacuum deposition method, ion plating method, plasma CVD method is 0.133 mPa to 6.65 Pa, more preferably 0.665 mPa to 1.33 Pa. Before such a transparent conductive layer is provided, the film is preferably subjected to a surface treatment such as plasma treatment (reverse sputtering) and corona discharge treatment. Further, during the preparation of the transparent conductive layer, the temperature may be raised to 50 to 200° C.

The transparent conductive layer formed as described above preferably has a film thickness of 20 to 500 nm, more preferably 50 to 300 nm.

Further, the transparent conductive layer formed as described above has a surface electric resistance of 0.1 to 200Ω/□), more preferably 0.1 to 100Ω/□, still more preferably 0.5 to 60Ω/□, as measured at 25° C. and 60% RH (relative humidity). Furthermore, the transparent conductive layer preferably has a light transmission of 80% or more, more preferably 83% or more, further preferably 85% or more.

The film of the present invention may also be provided with a gas barrier layer on at least one surface in order to suppress gas permeability. Examples of preferred gas barrier layer include, for example, those of metal oxides containing one or more kinds of metals selected from the group consisting of silicon, aluminum, magnesium, zinc, zirconium, titanium, yttrium and tantalum as a main component, metal nitrides of silicon, aluminum and boron, and mixtures thereof. Among these, metal oxides containing silicon oxide containing oxygen atoms at an atomic number ratio of 1.5 to 2.0 with respect to silicon atoms as a main component are preferred in view of gas barrier property, transparency, surface smoothness, flexibility, membrane stress, cost and so forth. Such an inorganic gas barrier layer comprising any of these inorganic compounds can be prepared by, for example, a vapor phase deposition method in which a material is deposited from a vapor phase to form a film, such as the sputtering method, vacuum deposition method, ion plating method and plasma CVD method. Among these, the sputtering method is preferred, because it can provide particularly superior gas barrier property. Further, during the preparation of the transparent conductive layer, the temperature may be raised to 50 to 200° C.

The aforementioned gas barrier layer preferably has a film thickness of 10 to 300 nm, more preferably 30 to 200 nm.

Although the aforementioned gas barrier layer may be provided on the same side as the transparent conductive layer, or the side opposite to the transparent conductive layer side, it is preferably provided on the side opposite to the transparent conductive layer side.

As for the gas barrier performance of the film, the film preferably has a water vapor permeability of 0.01 to 5 g/m$^2$·day, more preferably 0.03 to 3 g/m$^2$·day, still more preferably 0.05 to 2 g/m$^2$·day, as measured at 40° C. and 90% RH, and an oxygen permeability of 0.01 to 1 mL/m$^2$·day·atm, more preferably 0.01 to 0.7 mL/m$^2$·day·atm, still more preferably 0.01 to 0.5 mL/m$^2$·day·atm, as measured at 40° C. and 90% RH. If the gas barrier performance is within the ranges mentioned above, when the film is used in, for example, an organic EL device or LCD, degradation of the EL device by water vapor and oxygen can be substantially avoided, and therefore such gas barrier performance is preferred.

In order to improve the barrier property, a defect compensating layer is preferably provided adjacently to the gas barrier layer. As the defect compensating layer, (1) an inorganic oxide layer prepared by using a sol-gel method as disclosed in U.S. Pat. No. 6,171,663 and Japanese Patent Laid-open Publication No. 2003-94572, and (2) an organic substance layer disclosed in U.S. Pat. No. 6,413,645 can be used. These defect compensating layers can be prepared by a method of depositing a layer by vacuum vapor deposition and curing it with an ultraviolet ray or electron beam, or by coating a layer and then curing it with heating, electron beam, ultraviolet ray or the like. When the defect compensating layer is prepared by using coating, various conventionally used coating methods such as spray coating, spin coating and bar coating can be used.

For the purpose of imparting chemical resistance, the film of the present invention may be provided with an inorganic barrier layer, an organic barrier layer, an organic-inorganic hybrid barrier layer, or the like.

[Image Display Device and Flat Panel Display]

The optical film of the present invention can be used as a substrate for thin film transistor (TFT) display devices. For example, the method described in International Patent Publication in Japanese (Kohyo) No. 10-512104 and so forth can be used. Further, the substrate may have a color filter for color display. Although the color filter may be produced by using any kind of method, it is preferably produced by a photolithography technique.

The resin composition of the present invention and an optical film utilizing it explained above can be used for image display apparatuses. The image display apparatuses referred to herein are not particularly limited, and they may be conventionally known image display devices. Further, flat panel displays showing superior display quality can be produced by using the optical film of the present invention as a substrate. Examples of display devices of flat panel displays include liquid crystal display devices, plasma displays, electroluminescence (EL) display devices, fluorescent character display tubes, light emitting diodes and so forth, and other than these, the film can be used as a substrate replacing glass substrates of displays in which glass substrates have conventionally been used. Furthermore, in addition to flat panel displays, the resin composition and optical film of the present invention can also be applied for use of solar battery, touch panel and so forth. As for touch panel, the present invention can be applied to those disclosed in Japanese Patent Laid-open Publication Nos. 5-127822, 2002-48913 and so forth.

When the optical film of the present invention is used as a substrate for liquid crystal displays and so forth, the resin composition of the present invention is preferably an amorphous polymer so that optical uniformity can be attained. Furthermore, for the purpose of controlling retardation (Re) and wavelength dispersion thereof, a resin showing positive or negative intrinsic birefringence may be combined, or a resin showing larger (or smaller) wavelength dispersion may be combined.

In the optical film of the present invention, a laminate of different resins or the like may be preferably used in order to control retardation (Re) or improve gas permeability and mechanical characteristics. No particular limitation is imposed on preferred combinations of different resins, and any combinations of the aforementioned resins can be used.

When the optical film of the present invention is used in a reflection type liquid crystal display, the apparatus preferably has a structure comprising, in the order from the bottom, a lower substrate, reflective electrode, lower oriented film, liquid crystal layer, upper oriented film, transparent electrode, upper substrate, λ/4 plate and polarizing film. Among these, the optical film of the present invention can be used as the transparent electrode and/or upper substrate. In the case of a color display, it is preferable to further provide a color filter layer between the reflective electrode and the lower oriented film or between the upper oriented film and the transparent electrode.

When the optical film of the present invention is used in a transmission type liquid crystal display, the apparatus preferably has a structure comprising, in the order from the bottom, a back light, polarizing plate, λ/4 plate, lower transparent electrode, lower oriented film, liquid crystal layer, upper oriented film, upper transparent electrode, upper substrate, λ/4 plate, and polarization film. Among these, the optical film of the present invention can be used as the upper transparent electrode and/or upper substrate. In the case of a color display, it is preferable to further provide a color filter layer between the lower transparent electrode and the lower oriented film or between the upper transparent electrode and the transparent electrode.

Type of liquid crystal cell is not particularly limited, and various display modes such as TN (Twisted Nematic), IPS (In-Plane Switching), FLC (Ferroelectric Liquid Crystal), AFLC (Anti-Ferroelectric Liquid Crystal), OCB (Optically Compensatory Bend), STN (Supper Twisted Nematic), VA (Vertically Aligned) and HAN (Hybrid Aligned Nematic) have been proposed. Furthermore, display modes in which alignment division (multi-domain) is adopted with the aforementioned display modes have also been proposed. The film of the present invention can be effectively used in liquid crystal display of any display mode. Furthermore, the film of the present invention can be effectively used in any of liquid crystal displays of transmission type, reflection type and semi-transmission type.

Liquid crystal cells and liquid crystal displays are disclosed in Japanese Patent Laid-open Publication No. 2-176625 and Japanese Patent Publication No. 7-69536, as well as SID97, Digest of tech. Papers, 28 (1997) 845, SID99, Digest of tech. Papers 30, (1999) 206, Japanese Patent Laid-open Publication No. 11-258605 for MVA, Monthly Display, Vol. 6, No. 3 (1999) 14 for SURVAIVAL, Asia Display 98, Proc. of the-18th-Inter. Display res. Conf. (1998) 383, Para-A in LCD/PDP International 99 for PVA, SID98, Digest of tech. Papers 29 (1998) 838 for DDVA, SID98, Digest of tech. Papers, 29 (1998) 319 for EOC, SID98, Digest of tech. Papers, 29 (1998) 1081 for PSHA, Asia Display 98, Proc. of the-18th-Inter. Display res. Conf. (1998) 375 for RFFMH, SID98, Digest of tech. Papers, 29 (1998) 702 for HMD, Japanese Patent Laid-open Publication No. 10-123478, International Patent Publication WO98/48320, Japanese Patent No. 3022477, International Patent Publication WO00/65384 and so forth.

The optical film of the present invention can be used for use in an organic EL display. Specific examples of layer structure of organic EL display device include positive electrode/luminescent layer/transparent negative electrode, positive electrode/luminescent layer/electron transport layer/transparent negative electrode, positive electrode/hole transport layer/luminescent layer/electron transport layer/transparent negative electrode, positive electrode/hole transport layer/luminescent layer/transparent negative electrode, positive electrode/luminescent layer/electron transport layer/electron injection layer/transparent negative electrode, positive electrode/hole injection layer/hole transport layer/luminescent layer/electron transport layer/electron injection layer/transparent negative electrode and so forth.

With an organic EL device for which the optical film of the present invention can be used, light emission can be obtained by applying a direct current (alternating current component may be included as required) voltage (usually 2 to 40 V) or direct current between the positive electrode and the negative electrode. For driving of such light emitting devices, the methods described in Japanese Patent Laid-open Publication Nos. 2-148687, 6-301355, 5-29080, 7-134558, 8-234685, 8-241047, U.S. Pat. Nos. 5,828,429, 6,023,308, Japanese Patent No. 2784615 and so forth can be used.

As the full color display mode of organic EL device, any mode such as color filter mode, 3-color independent light emission mode and color conversion mode may be used.

EXAMPLES

Hereafter, the present invention will be further specifically explained by referring to examples. However, the materials, amounts used, ratios, types of processes, order of processes and so forth mentioned in the examples may be optionally changed so long as such changes do not depart from the spirit of the present invention. Therefore, the scope of the present invention should not be construed in any limitative way on the basis of the following examples.

1. Methods for Measuring Characteristic Values (1) Weight Average Molecular Weight Weight average molecular weight was obtained by GPC measurement providing polystyrene-converted molecular weights using HLC-8120 GPC produced by Tosoh Corp. and tetrahydrofuran or DMF as solvent and comparison with molecular weight standards of polystyrene.

(2) Glass Transition Temperature (Tg)

Glass transition temperature was measured by DSC method (in nitrogen gas, temperature increasing rate: 10° C./minute) using DSC 6200 produced by SEIKO Co., Ltd.

(3) Thickness of Film Substrate

Thickness was measured by using a dial type thickness gauge, K402B, produced by ANRITSU Corp.

(4) Retardation (Re)

Refractive index values were measured at a wavelength of 632.8 nm for directions along film plane by using an automatic birefringence meter (KOBRA-21ADH produced by Oji Scientific Instruments Co., Ltd.), and retardation was calculated from the values in accordance with the following equation.

$$\text{Retardation} = |nMD - nTD| \times d$$

In the equation, nMD is a refractive index of a film for transverse direction, nTD is a refractive index of the film for longitudinal direction, and d is thickness of the film.

(5) Light Transmission of Film Substrate

Transmission for a wavelength of 550 nm was measured by using a spectrophotometer (Spectrophotometer UV-3100PC produced by Shimadzu Corporation).

(6) Mechanical Characteristics of Film Substrate

A film sample (1.0 cm×5.0 cm) was prepared, and tensile modulus of elasticity of the sample was measured under a condition of a drawing speed of 3 mm/minute by using Tensilon RTM-25 produced by Toyo Baldwin Co., Ltd. The measurement was performed for 3 samples, and an average of the measured values was calculated and used for evaluation (the samples were left overnight at 25° C. and 60% RH before use, chuck gap: 3 cm).

Example 1

Synthesis of Monomer M-1

Monomer M-1 was synthesized according to the route shown below.

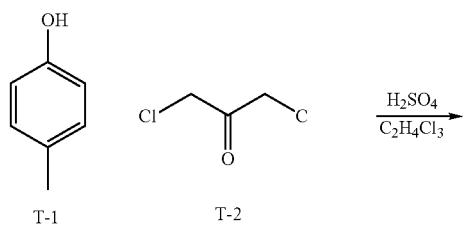

39

-continued

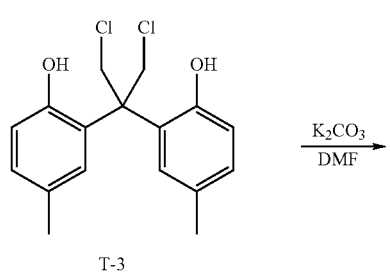

T-3

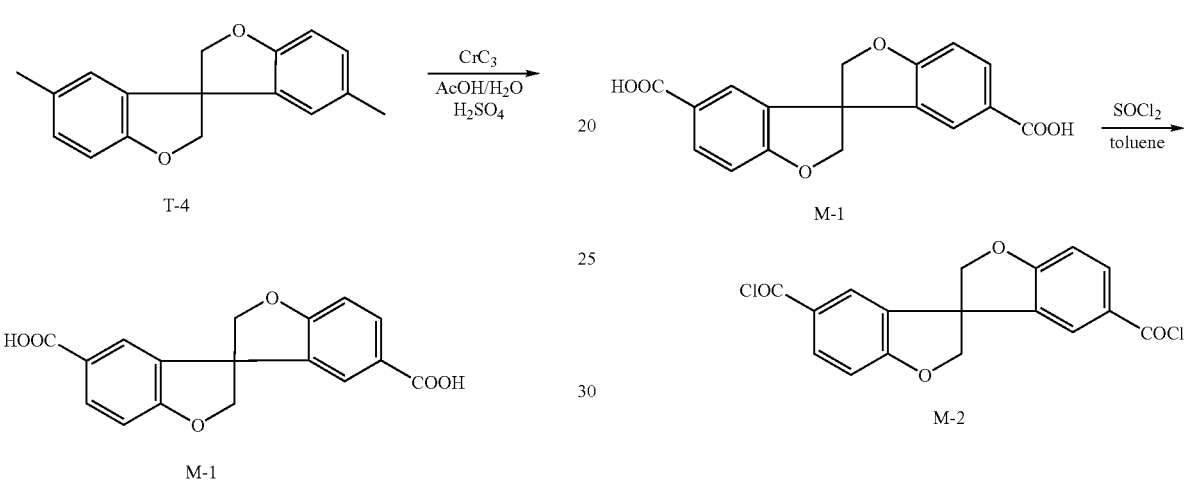

T-4

M-1

In an amount of 216.3 g (2.0 mol) of T-1 and 63.5 g (0.50 mol) of T-2 were dissolved in 700 mL of dichloroethane, and 56.2 mL of concentrated sulfuric acid was slowly added dropwise at room temperature so that the internal temperature should not exceed 30° C. After reaction was allowed for 6 hours, the dichloroethane layer was evaporated under reduced pressure, ethyl acetate was added to the residue, and the organic layer was washed with water. The organic layer was dried over magnesium sulfate, and then ethyl acetate was removed by evaporation under reduced pressure. In a volume of 1400 mL of DMF was added to dissolve the residue. In an amount of 207.3 g of potassium carbonate was added to the solution, and the solution was stirred at room temperature for 24 hours for reaction. The reaction system was poured into water, and extracted with ethyl acetate. The organic layer was washed with water and dried, and the residue was recrystallized from acetonitrile to obtain 67 g of T-4 (yield: 53%).

Then, 60 g of 1-4 was dissolved in 3 L of acetic acid, and 2 L of water was added. After 330 mL of concentrated sulfuric acid was added at room temperature, 108 g of chromium oxide was added, and the reaction mixture was refluxed for 24 hours for reaction. After cooled to room temperature, the reaction mixture was poured into 10 L of ice water, and crystals were taken by filtration. The crystals were dissolved in an aqueous alkaline solution, and the solution was made acidic to deposit crystals. The crystals were collected by filtration, then washed with methanol and dried to obtain 24.6 g of M-1 (yield: 33%).

40

When M-1 obtained was analyzed by NMR, the following peaks were observed.

<$^1$H NMR (DMSO-$d_6$)>

4.75 (1H, d), 4.92 (1H, d), 7.05 (1H, d), 7.55 (1H, 9), 7.86 (1H, d), 12.65 (1H)

Example 2

Synthesis of Monomer M-2

Monomer M-2 was synthesized according to the route shown below.

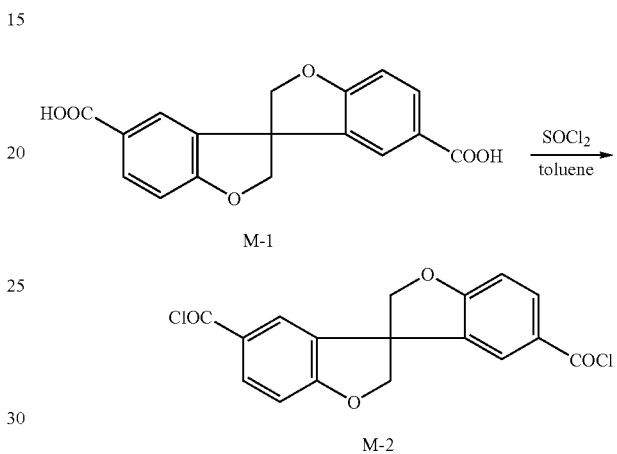

M-1

M-2

In an amount of 24 g of M-1 was dispersed in 100 mL of toluene, and 12.3 mL of thionyl chloride and then 0.1 mL of DMF were added. Reaction was allowed in this mixture at 70° C. for 6 hours. Toluene and thionyl chloride were evaporated under reduced pressure, and the residue was recrystallized from toluene and dried to obtain 25 g of M-2 (yield: 93%).

When M-2 obtained was analyzed by NMR, the following peaks were observed.

<$^1$H NMR (CDCl$_3$)>

4.75 (2H, d), 4.87 (2H, d), 7.02 (2H, d), 7.78 (2H, s), 8.13 (2H, d)

Example 3

Synthesis of Monomer M-4

Monomer M-4 was synthesized according to the route shown below.

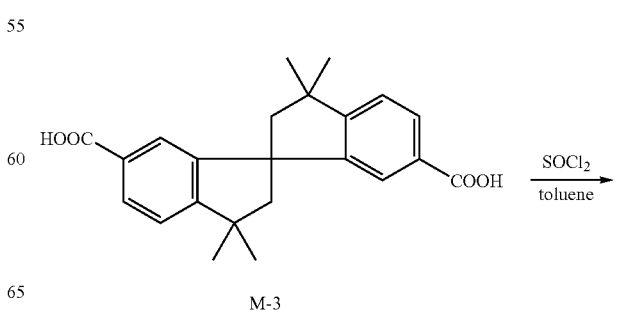

M-3

-continued

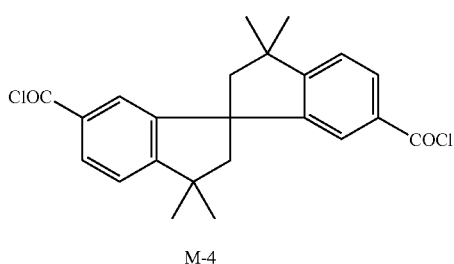

M-3 was synthesized by the method described in J. Chem. Soc., sections 418 to 420 (1962). Further, the acid chloride M-4 was synthesized in the same manner as that used for M-2.

When M-4 obtained was analyzed by NMR, the following peaks were observed.

<$^1$H NMR (CDCl$_3$)>

1.29 (6H, s), 1.35 (6H, s), 2.50 (2H, d), 2.66 (2H, d), 7.42 (2H, d), 7.57 (2H, d), 8.22 (2H, d-d)

Example 4

Synthesis of Monomer M-6

Monomer M-6 was synthesized according to the route shown below.

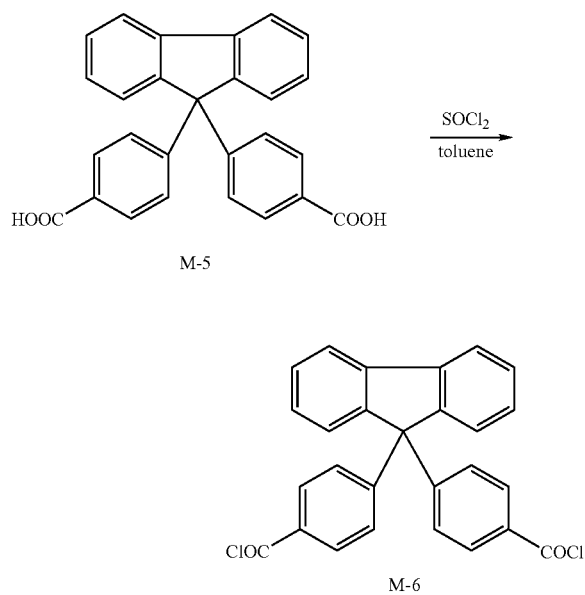

M-5 was purchased from JFE Chemical, Inc. The acid chloride M-6 was synthesized in the same manner as that used for M-2.

When M-6 obtained was analyzed by NMR, the following peaks were observed.

<($^1$H NMR (CDCl$_3$)>

7.30 (8H), 7.43 (2H), 7.81 (2H), 8.00 (4H)

Example 5

Preparation of Exemplary Compound (P-1)

In an amount of 61.7 g (200 mmol) of 6,6'-dihydroxy-3,3,3',3'-tetramethyl-1,1'-spirobiindane, 2.78 g (10 mmol) of tetrabutylammonium chloride, 0.6 g of sodium hydrosulfite, 375 mL of dichloromethane and 750 mL of water were put into a reaction vessel equipped with a stirrer and stirred at a stirring rate of 300 rpm on a water bath under a nitrogen flow. To this reaction mixture, a solution obtained by dissolving 69.8 g (200 mmol) of M-2 in 250 mL of dichloromethane and 210 mL of 2 M (2 N) NaOH aqueous solution were added dropwise over 1 hour by using a dropping apparatus. After 5 hours, 300 mL of dichloromethane was added, and the organic phase was separated. A solution obtained by diluting 2.0 mL of 12 M (12 N) hydrochloric acid with 1 L of water was added to the organic phase for washing. The organic phase was further washed twice with 750 mL of water. Then, 300 mL of dichloromethane was added to the separated organic phase for dilution, and then the organic phase was poured into 7.5 L of vigorously stirred methanol over 1 hour.

The obtained white precipitates were collected by filtration, dried by heating at 40° C. for 12 hours, and then dried at 70° C. under reduced pressure for 3 hours to obtain 93.5 g of Exemplary Compound P-1.

Molecular weight of Exemplary Compound P-1 obtained was measured by GPC (THF solvent), and as a result, it was found to have a weight average molecular weight of 150,000. Further, Tg measured by DSC was 335° C.

Example 6

Preparation of Exemplary Compound (P-2)

Exemplary Compound P-2 was synthesized in the same manner as that used for Example 5 by using M-2 and 5,5'-dihydroxy-3,3'-spirobibenzofuran as the monomers.

Molecular weight of Exemplary Compound P-2 obtained was measured by GPC (THF solvent), and as a result, it was found to have a weight average molecular weight of 120,000. Further, Tg measured by DSC was 330° C.

Example 7

Preparation of Exemplary Compound (P-3)

Exemplary Compound P-3 was synthesized in the same manner as that used for Example 5 by using M-2 and 9,9-bis (4-hydroxy)fluorene as the monomers.

Molecular weight of Exemplary Compound P-3 obtained was measured by GPC (THF solvent), and as a result, it was found to have a weight average molecular weight of 110,000. Further, Tg measured by DSC was 340° C.

Example 8

Preparation of Exemplary Compound (P-9)

In an amount of 69.7 g (200 mmol) of 9,9-bis(4-aminophenyl)fluorene was dissolved in 400 mL of dimethylacetamide and frozen on a dry ice/acetone bath. To this frozen solution, 69.8 g (200 mmol) of M-2 was added, moved on an ice bath, and stirred for 5 hours. The solution was added to 10 L of methanol to precipitate polymer, and the polymer was stirred in boiling methanol and vacuum-dried to obtain Exemplary Compound P-9.

Molecular weight of Exemplary Compound P-9 obtained was measured by GPC (DMAc solvent), and as a result, it was found to have a weight average molecular weight of 100,000. Further, Tg measured by DSC was 381° C.

Example 9

Preparation of Exemplary Compound (P-27)

Exemplary Compound P-27 was synthesized in the same manner as that used for Example 5 by using M-6 and 9,9-bis(4-hydroxy)fluorene as the monomers.

Molecular weight of Exemplary Compound P-27 obtained was measured by GPC (THF solvent), and as a result, it was found to have a weight average molecular weight of 100,000. Further, Tg measured by DSC was 383° C.

Example 10

Preparation of Exemplary Compound (P-30)

Exemplary Compound P-30 was synthesized in the same manner as that used for Example 5 by using M-6 and 5,5'-dihydroxy-3,3'-spirobibenzofuran as the monomers.

Molecular weight of Exemplary Compound P-30 obtained was measured by GPC (THF solvent), and as a result, it was found to have a weight average molecular weight of 105,000. Further, Tg measured by DSC was 342° C.

Example 11

Preparation of Exemplary Compound (P-34)

Exemplary Compound P-34 was synthesized in the same manner as that used for Example 5 by using M-6 and terephthalic acid dichloride (mixture at a molar ratio of 1:1) as well as 9,9-bis(4-hydroxy)fluorene as the monomers.

Molecular weight of Exemplary Compound P-34 obtained was measured by GPC (THF solvent), and as a result, it was found to have a weight average molecular weight of 90,000. Further, Tg measured by DSC was 350° C.

Example 12

Preparation of Exemplary Compound (P-37)

Exemplary Compound P-37 was synthesized in the same manner as that used for Example 8 by using M-6 and 9,9-bis(4-aminophenyl)fluorene as the monomers.

Molecular weight of Exemplary Compound P-37 obtained was measured by GPC (DMAc solvent), and as a result, it was found to have a weight average molecular weight of 80,000. Further, Tg was not observed up to 400° C. as measured by DSC, and therefore it is considered that Tg of P-37 exceeds 400° C.

Comparative Example 1

The following polyarylate (IND-1) was obtained by the method shown below.

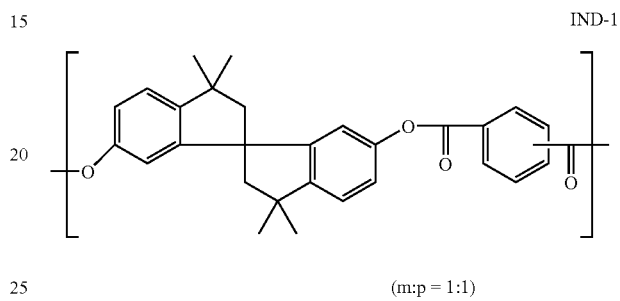

(m:p = 1:1)

IND-1 was synthesized in the same manner as that used for Example 5 by using terephthalic acid dichloride and isophthalic acid dichloride (mixture at a molar ratio of 1:1) as well as 6,6'-dihydroxy-3,3,3',3'-tetramethyl-1,1'-spirobiindane as the monomers.

Molecular weight of Compound IND-1 obtained was measured by GPC (THF solvent), and as a result, it was found to have a weight average molecular weight of 90,000. Further, Tg measured by DSC was 282° C.

Comparative Example 2

The following polyarylate (FL-1) was obtained by the method shown below.

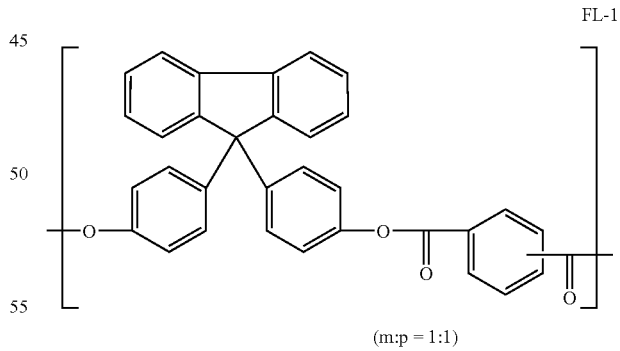

(m:p = 1:1)

Exemplary Compound FL-1 was synthesized in the same manner as that used for Example 5 by using terephthalic acid dichloride and isophthalic acid dichloride (mixture at a molar ratio of 1:1) as well as 9,9-bis(4-hydroxy)fluorene as the monomers.

Molecular weight of Compound FL-1 obtained was measured by GPC (THF solvent), and as a result, it was found to have a weight average molecular weight of 100,000. Further, Tg measured by DSC was 324° C.

Example 13

Preparation of Optical Film of the Present Invention

Each of the polymers produced in Examples 5 to 12 as well as Comparative Examples 1 and 2 was dissolved in methylene chloride or DMAc to prepare 15 to 25 weight % solutions. Each of the solutions was filtered through a 5-μm filter, and then cast on a glass substrate by using a doctor blade. After the casting, the solution was dried by heating at 80° C. for 2 hours and then at 100° C. for 4 hours when methylene chloride was used, or at 100° C. for 2 hours and then at 150° C. for 4 hours when DMAc was used. Then, the film was delaminated from the glass substrate to prepare each of Films F-101 to F-110. Thermal property, optical property and mechanical property of the obtained Films F-101 to F-110 were evaluated. The results are shown in Table 1.

TABLE 1

|  | Polymer | Film | Tg (° C.) | Re (nm) | Light transmission (%) | Tensile modulus of elasticity (MPa) |
| --- | --- | --- | --- | --- | --- | --- |
| Example 1 | P-1 | F-101 | 335 | 0.2 | 88 | 1500 |
| Example 2 | P-2 | F-102 | 330 | 0.2 | 90 | 1800 |
| Example 3 | P-3 | F-103 | 340 | 1.0 | 91 | 1800 |
| Example 4 | P-9 | F-104 | 381 | 1.2 | 90 | 2000 |
| Example 5 | P-27 | F-105 | 383 | 1.5 | 89 | 1800 |
| Example 6 | P-30 | F-106 | 342 | 0.8 | 90 | 1800 |
| Example 7 | P-34 | F-107 | 350 | 1.1 | 90 | 1800 |
| Example 8 | P-37 | F-108 | >400 | 1.8 | 89 | 2000 |
| Comparative Example 1 | IND-1 | F-109 | 282 | 10.5 | 90 | 1300 |
| Comparative Example 2 | FL-1 | F-110 | 324 | 8.2 | 90 | 1900 |

From the results shown in Table 1, it can be seen that Films F-101 to 10B according to the present invention had smaller Re compared with the comparative examples F-109 and F-110, and thus they showed lower birefringence. Moreover, it can also be seen that Tg of the films of the present invention was also improved compared with the comparative example F-109 and F-110. Furthermore, F-101 to 108 had a tensile modulus of elasticity of 1500 MPa or more, which is a practically satisfactory level.

The results mentioned above show that Films F-101 to 108 according to the present invention had favorable mechanical properties and glass transition temperatures, and achieved low birefringence.

Example 14

Preparation and Evaluation of Flat Panel Displays According to the Present Invention (TN Type Liquid Crystal Displays)

1. Formation of Gas Barrier Layers

Gas barrier layers were sputtered on the both surfaces of each of Films 101 to 110 mentioned above by the DC magnetron sputtering method at an output of 5 kW under vacuum of 500 Pa in an Ar atmosphere using $SiO_2$ as a target. The obtained gas barrier layers had a film thickness of 60 nm.

2. Formation of Transparent Conductive Layers

A transparent conductive layer consisting of an ITO film having a thickness of 140 nm was provided on one side of each of Films 101 to 110 provided with the gas barrier layer with heating to 100° C. by the DC magnetron sputtering method at an output of 5 kW under vacuum of 0.665 Pa in an Ar atmosphere using ITO ($In_2O_3$: 95 weight %, $SnO_2$: 5 weight %) as a target.

3. Heat Treatment of Optical Films Having Transparent Conductive Layer

Each of Films 101 to 110 provided with the transparent conductive layer obtained above was subjected to a heat treatment at 300° C. for 1 hour assuming disposition of TFT.

Film F-109 was markedly deformed by this heat treatment, and therefore it was rot further evaluated.

4. Preparation of Circularly Polarizing Films

The λ/4 plate described in Japanese Patent Laid-open Publication Nos. 2000-826705 and 2002-131549 was laminated on each of the film substrates F-101 to F-108 of the present invention and the comparative film substrate F-110 on the side opposite to the transparent conductive layer side, and the polarizing plate described in Japanese Patent Laid-open Publication No. 2002-865554 was further laminated thereon to prepare a circularly polarizing plate. The λ/4 plate and the polarizing plate were disposed so that the transmission axis of the polarizing film and the lagging axis of the λ/4 plate should make an angle of 45°.

5. Preparation of TN Type Liquid Crystal Displays

An oriented polyimide film (SE-7992 produced by Nissan Chemical Industries, Ltd.) was provided on the transparent conductive layer (ITO) side of each of the film substrates of the present invention F-101 to F-108 and the comparative film substrate F-110 as well as an electrode side of a glass substrate provided with an aluminum reflective electrode having fine unevenness on the surface, and subjected to a heat treatment at 200° C. for 30 minutes. No increase in resistance and gas permeability was observed at all for the samples utilizing the film substrates of the present invention F-101 to F-108. On the other hand, resistance and gas permeability increased 2 times or more in the sample utilizing the comparative film substrate F-110.

After the samples were subjected to a rubbing treatment, two of substrates (glass substrate and plastic substrate) were laminated via a spacer having a thickness of 1.7 μm so that the oriented films should face each other. The directions of the substrates were adjusted so that the rubbing directions of two of the oriented films should cross at an angle of 110°. Liquid crystal (MLC-6252, Merck Ltd.) was injected into the gap between the substrates to prepare a liquid crystal layer. As described above, TN type liquid crystal cells having a twisting angle of 70° and Δnd of 269 nm were prepared.

Further, the aforementioned λ/4 plate and polarizing plate were laminated on each plastic film substrate on the side opposite to the ITO side to prepare reflective type liquid crystal display devices.

Good images were obtained with those utilizing the plastics substrates of the present invention F-101 to F-108. On the other hand, the sample utilizing the comparative film substrate F-110 generated black spot defects (image portions became fine black spots, and thus images were not displayed) due to reduction of gas barrier property and color drift due to cracks in the conductive layer.

Example 15

Preparation and Evaluation of Flat Panel Displays of the Present Invention (Organic EL Display)

An aluminum lead wire was connected from the transparent electrode of each optical film provided with a transparent conductive layer and subjected to a heat treatment as described above to form a laminated structure. An aqueous dispersion of polyethylene dioxythiophene/polystyrenesulfonic acid (Baytron P, BAYER, solid content: 1.3 weight %) was applied on the surface of the transparent electrode by spin coating and then vacuum-dried at 150° C. for 2 hours to form a hole transporting organic thin film layer having a thickness of 100 nm. This was designated Substrate X.

Further, an application solution for light-emitting organic thin film layer having the following composition was applied on one side of a temporary support made of polyethersulfone having a thickness of 188 μm (SUMILITE FS-1300 produced by Sumitomo Bakelite) by using a spin coater and dried at room temperature to form a light-emitting organic thin film layer having a thickness of 13 nm on the temporary support. This was designated Transfer Material Y.

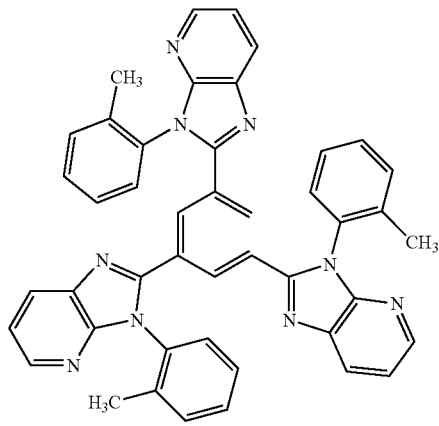

| | |
|---|---|
| Polyvinyl carbazole | 40 parts by weight |
| (Mw = 63000, Aldrich) | |
| Tris(2-phenylpyridine) iridium | 1 part by weight |
| complex (Ortho-metalated complex) | |
| Dichloroethane | 3200 parts by weight |

The light-emitting organic thin film layer side of Transfer Material Y was overlaid on the upper surface of the organic thin film layer of Substrate X, heated and pressurized under the conditions of 160° C., 0.3 MPa and 0.05 m/min by using a pair of heat rollers, and the temporary support was delaminated to transfer the light-emitting organic thin film layer onto the upper surface of Substrate X. This was designated Substrate XY.

Further, a patterned mask for vapor deposition (mask providing a light-emitting area of 5 mm×5 mm) was set on one side of a polyimide film (UPILEX-50S, Ube Industries) cut into a 25-mm square and having a thickness of 50 μm, and Al was vapor-deposited in a reduced pressure atmosphere of about 0.1 mPa to form an electrode having a film thickness of 0.3 μm. $Al_2O_3$ was vapor-deposited by DC magnetron sputtering using an $Al_2O_3$ target with a film thickness of 3 nm in the same pattern as the Al layer. An aluminum lead wire was connected from the Al electrode to form a laminated structure. An application solution for electron transporting organic thin film layer having the following composition was applied on the obtained laminated structure by using a spin coater and vacuum-dried at 80° C. for 2 hours to form an electron transporting organic thin film layer having a thickness of 15 nm. This was designated Substrate Z.

| | |
|---|---|
| Polyvinyl butyral | 10 parts by weight |
| (2000L produced by Denki | |
| Kagaku Kogyo, Mw = 2000,) | |
| 1-Butanol | 3500 parts by weight |
| Electron transporting compound | 20 parts by weight |
| having the following structure | |

Substrate XY and Substrate Z were stacked so that the electrodes should face each other via the light-emitting organic thin film layer between them, heated and pressurized at 160° C., 0.3 MPa and 0.05 m/min by using a pair of heat rollers to obtain Organic EL Devices 201 to 208 and 210.

DC voltage was applied to each of the obtained Organic EL Devices 201 to 208 and 210 by using Source-Measure Unit Model 2400 (Toyo Corporation). It was confirmed that Organic EL Devices 201 to 208 according to the present invention could emit light. On the other hand, although the comparative Organic EL Device 210 emitted light for a moment, it immediately stopped emitting light.

The resin composition of the present invention has superior heat resistance, optical characteristics, mechanical characteristics etc., and therefore it can be utilized as optical films such as transparent conductive film substrate, TFT substrate, substrate for liquid crystal display, substrate for organic EL display, substrate for electronic paper, substrate for solar battery, and optical disk substrate, and for optical components such as optical waveguide, optical fiber, lens and touch panel, flat panel displays and so forth.

The present disclosure relates to the subject matter contained in Japanese Patent Application No. 087398/2004 filed on Mar. 24, 2004, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A resin composition containing a polymer comprising a chemical structure represented by the following formula (1) or (2) as a repeating unit:

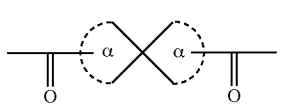

Formula (1)

wherein the rings α represent a monocyclic or polycyclic ring, and two of the rings α may be identical or different, and are bound via a spiro bond,

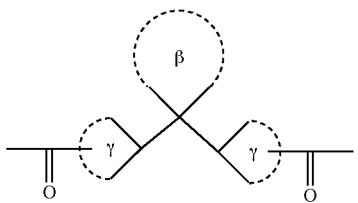

Formula (2)

wherein the ring β and the rings γ represent a monocyclic or polycyclic ring, and two of the rings γ may be identical or different, and bond to one quaternary carbon atom in the ring β.

2. The resin composition according to claim 1, wherein the polymer comprises a chemical structure represented by the formula (1) as a repeating unit.

3. The resin composition according to claim 2, wherein the polymer is derived from the dicarboxylic acid represented by the following formula (3) or a derivative thereof:

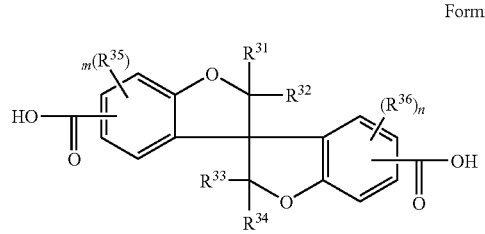

Formula (3)

wherein $R^{31}$ to $R^{34}$ each independently represent hydrogen atom or a substituent, $R^{35}$ and $R^{36}$ each independently represent a substituent, and m and n each independently represent an integer of 0 to 3.

4. The resin composition according to claim 2, wherein the polymer comprises a chemical structure represented by the following formula (4) as a repeating unit:

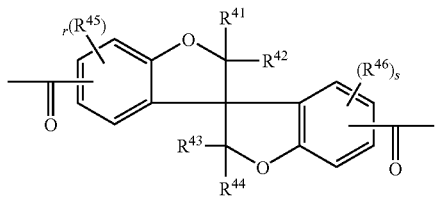

Formula (4)

wherein $R^{41}$ to $R^{44}$ each independently represent hydrogen atom or a substituent, $R^{45}$ and $R^{46}$ each independently represent a substituent, and r and s each independently represent an integer of 0 to 3.

5. The resin composition according to claim 2, wherein the polymer comprises a chemical structure represented by the following formula (5) as a repeating unit:

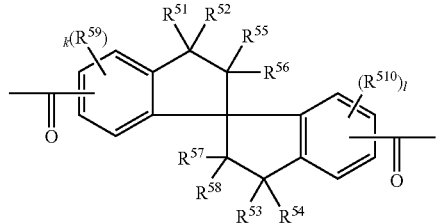

Formula (5)

wherein $R^{51}$ to $R^{58}$ each independently represent hydrogen atom or a substituent, $R^{59}$ to $R^{510}$ each independently represent a substituent, and k and l each independently represent an integer of 0 to 3.

6. The resin composition according to claim 2, wherein the polymer comprises a chemical structure represented by the following formula (6) as a repeating unit:

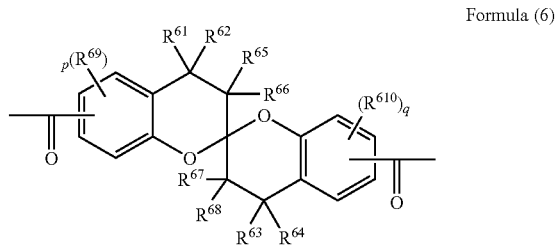

Formula (6)

wherein $R^{61}$ to $R^{68}$ each independently represent hydrogen atom or a substituent, $R^{69}$ and $R^{610}$ each independently represent a substituent, and p and q each independently represent an integer of 0 to 3.

7. The resin composition according to claim 1, wherein the polymer comprises a chemical structure represented by the formula (2) as a repeating unit.

8. The resin composition according to claim 7, wherein the polymer comprises a chemical structure represented by the following formula (7) as a repeating unit:

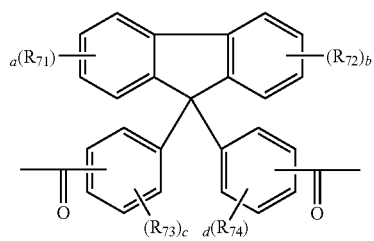

Formula (7)

wherein $R^{71}$ to $R^{74}$ each independently represent a substituent, a, b, c and d each independently represent an integer of 0 to 4.

9. The resin composition according to claim 1, wherein the polymer has a grass transition temperature of 200° C. or higher.

10. A film utilizing the resin composition according to claim 1.

11. The film according to claim 10, wherein the film is an optical film.

12. The film according to claim 10, wherein the film is an gas barrier film.

13. The film according to claim 12, wherein a gas barrier layer is provided on at least one surface of a layer comprising the resin composition.

14. The film according to claim 10, wherein the film is a conductive film.

15. The film according to claim 14, wherein a transparent conductive layer is provided on at least one surface of a layer comprising the resin composition.

16. An image display utilizing the film according to claim 14 as a substrate.

17. The image display according to claim 16, which has a flat panel display.

18. The image display according to claim 17, wherein the flat panel is a liquid crystal panel or an organic electroluminescence panel.

* * * * *